(12) United States Patent
Morita

(10) Patent No.: US 12,272,942 B2
(45) Date of Patent: *Apr. 8, 2025

(54) POWER SUPPLY SYSTEM

(71) Applicant: DENSO CORPORATION, Kariya (JP)

(72) Inventor: Tetsuo Morita, Kariya (JP)

(73) Assignee: DENSO CORPORATION, Kariya (JP)

( * ) Notice: Subject to any disclaimer, the term of this patent is extended or adjusted under 35 U.S.C. 154(b) by 111 days.

This patent is subject to a terminal disclaimer.

(21) Appl. No.: 18/131,501

(22) Filed: Apr. 6, 2023

(65) Prior Publication Data

US 2023/0283066 A1 Sep. 7, 2023

Related U.S. Application Data

(63) Continuation of application No. PCT/JP2021/037131, filed on Oct. 7, 2021.

(30) Foreign Application Priority Data

Oct. 27, 2020 (JP) ................................ 2020-180039

(51) Int. Cl.
*H02H 7/00* (2006.01)
*B60R 16/023* (2006.01)
*H02H 7/20* (2006.01)

(52) U.S. Cl.
CPC ........... *H02H 7/20* (2013.01); *B60R 16/0232* (2013.01); *B60R 16/0238* (2013.01)

(58) Field of Classification Search
None
See application file for complete search history.

(56) References Cited

U.S. PATENT DOCUMENTS

| 6,600,239 B2 * | 7/2003 | Winick .................. H02J 1/102 307/85 |
| 11,949,260 B2 * | 4/2024 | Morita .................... B60R 16/03 |

(Continued)

FOREIGN PATENT DOCUMENTS

JP 5488046 B2 5/2014

*Primary Examiner* — Stephen W Jackson
(74) *Attorney, Agent, or Firm* — Oliff PLC

(57) ABSTRACT

A power supply system which includes a first system, a second system, and a system-to-system switch. The first system delivers electrical power from a first power supply to an electrical load through a first power feeding path. The second system delivers electrical power from a second power supply to the electrical load through a second power feeding path. The system-to-system switch is arranged in a connecting path which connects the first and second power feeding paths together. The power supply system also has an in-system switch which is disposed in the second power feeding path between a junction of the second power feeding path and the connecting path and the second power supply. When it is determined that a malfunction has occurred in the second system in a condition where the system-to-system switch and the in-system switch are closed, the system-to-system switch is opened. The power supply system controls an opening-closing operation of the in-system switch when the system-to-system switch is opened, thereby limiting flow of electrical current from the second power supply to the second system and prevents voltages applied to the system-to-system switch from undesirably dropping due to a surge voltage developed in the second system which arise from the limitation of flow of the electrical current.

10 Claims, 16 Drawing Sheets

(56) References Cited

U.S. PATENT DOCUMENTS

2011/0198920 A1\* 8/2011 Komuro ............... H02J 7/1438
903/930
2019/0047560 A1\* 2/2019 Kinoshita ............. B60R 16/033

\* cited by examiner

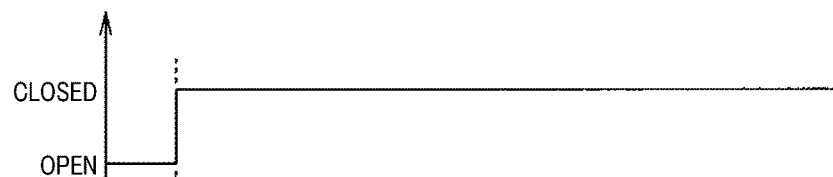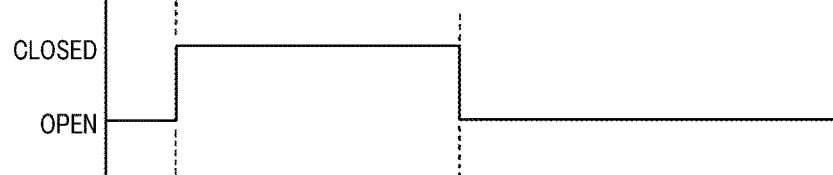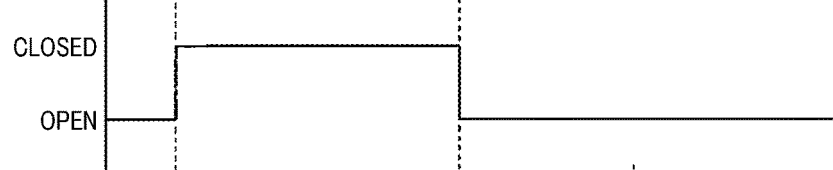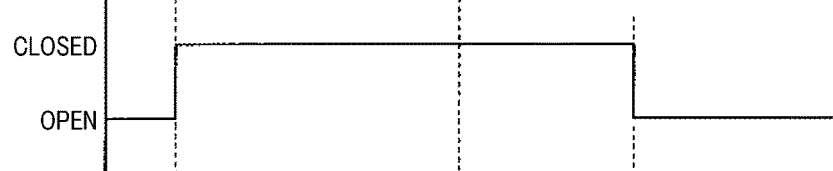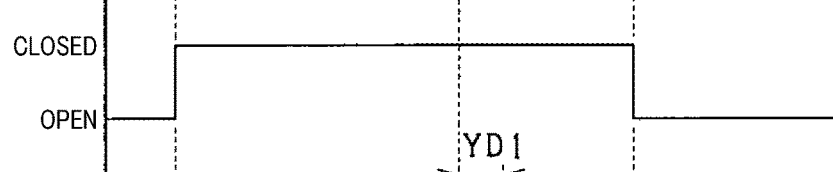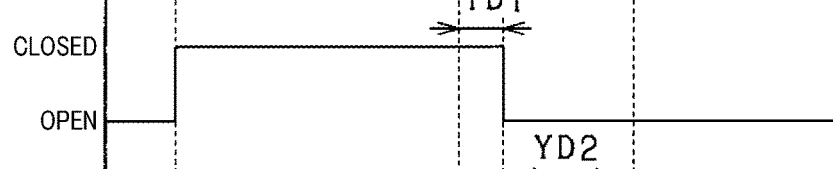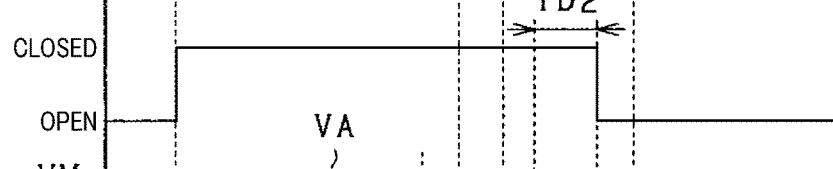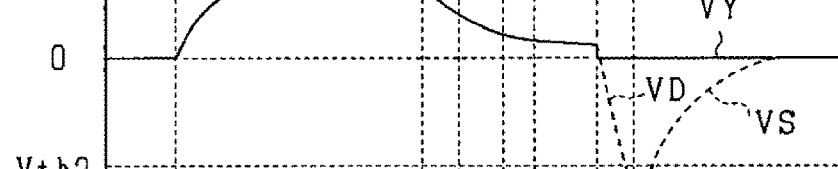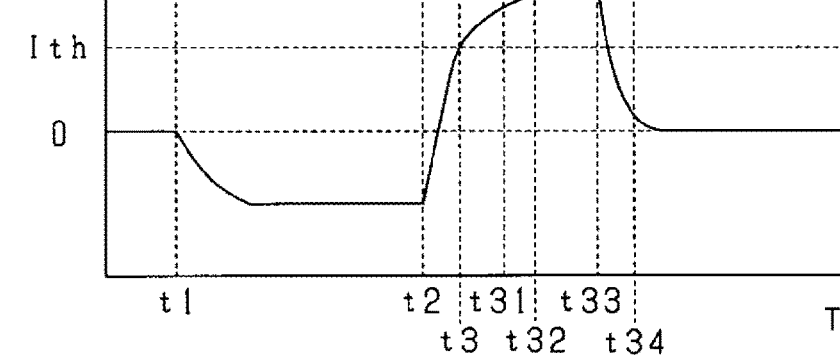

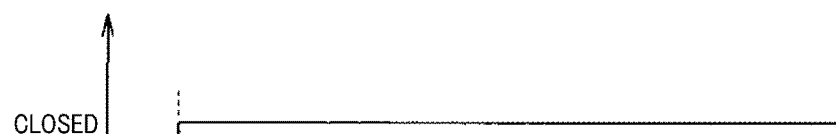
FIG.16(A) IG SWITCH
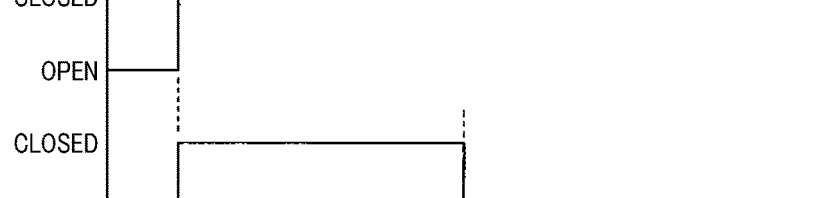
FIG.16(B) SW1
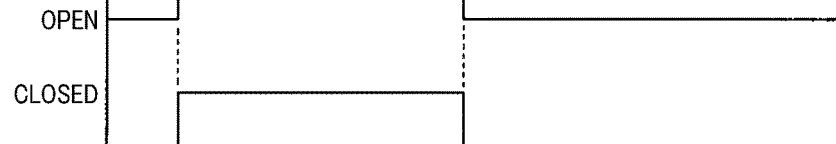
FIG.16(C) SW2
FIG.16(D) SW3
FIG.16(E) SW4
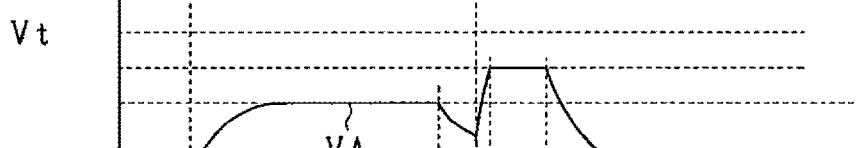
FIG.16(F) VD
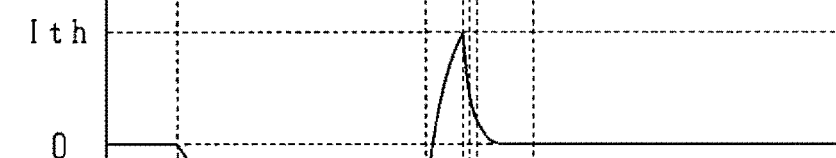
FIG.16(G) IC
FIG.16(H) ID

POWER SUPPLY SYSTEM

CROSS REFERENCE TO RELATED DOCUMENT

The present application claims the benefit of priority of Japanese Patent Application No. 2020-180039 filed on Oct. 27, 2020, the disclosure of which is incorporated in its entirety herein by reference.

TECHNICAL FIELD

This disclosure relates generally to a power supply system.

BACKGROUND ART

A power supply system is known which is used in an automotive vehicle to supply electrical power to a variety of devices installed in the vehicle. When a power feeding system through which the electrical power is delivered to an electrical load, such as an electrical braking device or an electrical steering device, which performs a function required by the vehicle during operation thereof has failed in operation, so that the power supply system is disabled, it will be impossible to keep the vehicle operating. In order to ensure the operation of the vehicle in the presence of some kind of failure during the operation of the vehicle, a system equipped with a first power supply and a second power supply is known.

Patent literature 1 discloses the above type of system which includes first and second electrical loads, a first channel through which electrical power is delivered from a first power supply to the first electrical load through a first power feeding path, and a second channel through which electrical power is delivered from a second power supply to the second electrical load through a second power feeding path. Such a power supply system is equipped with a channel-to-channel switch disposed in a connecting path which connects between the first and second power feeding paths. When determining that a malfunction has occurred in one of the first and second channels, the controller opens the system-to-system switch to ensure the supply of electrical power from the power supply to the corresponding electrical load through the other of the first and second channel which is properly in service, thereby enabling the corresponding electrical load to continue to operate properly.

PRIOR ART DOCUMENT

Patent Literature

Patent Literature 1: Japanese Patent No. 5488046

SUMMARY OF THE INVENTION

The above power supply system may be designed to have an in-channel switch which is arranged between a junction of the second power feeding path and the connecting path and a second power supply. When neither of the first and second channels is malfunctioning, the power supply system closes the channel-to-channel switch and in-channel switch to enable supply of electrical power to the electrical loads using the first and second power supplies in a redundant mode. When the channel-to-channel switch is opened in response to a malfunction occurring, for example, in the second channel, the in-channel switch is opened in order to eliminate a risk of over-discharge from the second power supply, but a negative surge voltage will be generated in the second channel due to a sharp drop in electrical current flowing through the second channel. When such a surge voltage exceeds a negative withstand voltage of the channel-to-channel switch, it results in a failure of the channel-to-channel switch to electrically insulate between the first channel which is properly in service and the second channel which is malfunctioning, which leads to a risk of a failure in operation of the electrical load through the first channel.

This disclosure was made in order to solve the above problem. It is an object of this disclosure to provide a power supply system which is equipped with a plurality of power supply systems and ensures the stability in delivering electrical power to an electrical load.

In order to eliminate the above problem, the first means is to provide a power supply system which comprises: (a) a first system which serves to deliver electrical power from a first power supply to an electrical load through a first power feeding path; (b) a second system which serves to deliver electrical power from a second power supply to the electrical load through a second power feeding path; (c) a system-to-system switch which is disposed in a connecting path which connects the first power feeding path and the second power feeding path together; (d) an in-system switch which is disposed between a junction and the second power supply, the junction connecting between the second power feeding path and the connecting path; (e) a malfunction determiner which determines whether a malfunction has occurred in the second system when the system-to-system switch and the in-system switch are placed in a closed state; (f) a condition controller which works to open the system-to-system switch when the malfunction is determined by the malfunction determiner to have occurred; and (g) a voltage drop controller which works to control an opening-closing operation of the in-system switch when the condition controller opens the system-to-system switch, thereby limiting flow of an electrical current from the second power supply to the second system. The voltage drop controller also works to avoid an excessive drop in voltage, as applied to the system-to-system switch, which arises from a surge voltage generated in the second system due to limitation of the flow of the electrical current.

The power supply system, as described above, includes the first system which is capable of delivering electrical power from the first power supply to the electrical load through the first power feeding path and the second system which is capable of delivering electrical power from the second power supply to the electrical load through the second power feeding path. This establishes a redundant power supply for the electrical load using the first power supply and the second power supply. The system-to-system switch is disposed in the connecting path connecting between the first and second power feeding paths. When it is determined that a malfunction has occurred in one of the first and second systems, it becomes possible for the electrical load to continue to operate by delivering the electrical power from the other of the first and second systems which is operating properly.

Specifically, the in-system switch is, as described above, disposed in the second power feeding path between the junction with the connecting path and the second power supply. When the system-to-system switch is opened due to the occurrence of malfunction in the second system, the in-system switch is, as described above, opened to avoid over-discharge of the second power supply, but however, a sharp decrease in electrical current flowing from the second power supply to the second system will result in generation of a negative surge voltage. When the negative surge voltage drops below a withstand voltage of the system-to-system switch, it will result in a failure in electrically isolating between the first system and the second system through the system-to-system switch, which leads to a failure in delivering electrical power to the electrical load through the first system.

In order to alleviate the above problem, when the system-to-system switch is opened, the above power supply system works to control the opening-closing operation of the in-system switch to limit the flow of electrical current from the second power supply to the second system and also to avoid a negative spike in voltage applied to the system-to-system switch which arises from the surge voltage occurring in the second system due to the limitation of the flow of the electrical current. The limitation of the flow of electrical current from the second power supply to the second system in the presence of the malfunction in the second system serves to avoid over-discharge of the second power supply. The surge voltage which arises from the limitation of the flow of electrical current results in a drop in voltage applied to the system-to-system switch, but however, an undesirable drop in such applied voltage is eliminated, thereby ensuring the stability in operating the system-to-system switch in the presence of surge voltage. This achieves required delivery of electrical power to the electrical load when a malfunction has occurred in the second system.

The second means is to provide the power supply system in which when the condition controller opens the system-to-system switch, the voltage drop controller controls the opening-closing operation of the in-system switch to reduce a rate of decrease in electrical current flowing from the second power supply to the second system.

The intensity of the surge voltage occurring in the second system is usually proportional to a rate of decrease in electrical current flowing through the second system. When limiting the flow of electrical current from the second power supply to the second system, the power supply system works to control the opening-closing operation of the in-system switch to reduce the rate of decrease in the electrical current flowing from the second power supply to the second system, thereby reducing the surge voltage generated in the second system to avoid an excessive drop in voltage applied to the system-to-system switch which arises from the surge voltage.

The third means is to provide the power supply system in which the in-system switch includes a first in-system switch and a second in-system switch which are connected in series with each other. The in-system switch is equipped with a diode which is connected to the first in-system switch in parallel thereto and has a forward direction from the second power supply to the junction connecting between the second power feeding path and the connecting path. When the condition controller opens the system-to-system switch, the voltage drop controller opens the first in-system switch and closes the second in-system switch.

In the above structure, when a negative surge voltage occurs in the second system when the system-to-system switch is opened, it will cause an electrical current to flow from the second power supply to the second system through the diode and the second in-system switch. The forward voltage at the diode serves to reduce the rate of decrease in electrical current flowing in the second system to avoid an excessive drop in voltage applied to the system-to-system switch.

The fourth means is to provide the power supply system in which when the condition controller opens the system-to-system switch, the voltage drop controller works to gradually decrease a duty cycle of an operating signal outputted to the in-system switch.

In the above structure, the duty cycle of the operating signal for the in-system switch is, as described above, decreased gradually when the system-to-system switch is opened, thereby reducing the rate of decrease in electrical current flowing in the second system to eliminate an undesirable drop in voltage applied to the system-to-system switch.

The fifth means is to provide the power supply system in which the voltage drop controller is equipped with a Zener diode which has a breakdown voltage higher than negative withstand voltage of the system-to-system switch and the in-system switch. When a surge voltage generated in the second system is higher than the breakdown voltage at a time when the condition controller opens the system-to-system switch, the voltage drop controller works to open the in-system switch to limit the flow of the electrical current from the second power supply to the second system. When the surge voltage generated in the second system becomes lower than the breakdown voltage, the Zener diode works to cancel the limitation of the flow of the electrical current between the second power supply and the second system.

The surge voltage occurring in the second system results from the limitation of flow of the electrical current from the second power supply to the second system. A drop in such surge voltage is reduced or minimized by canceling the limitation of flow of the electrical current between the second power supply and the second system. The above structure is, as described above, equipped with the Zener diode which has the breakdown voltage higher than the negative withstand voltages of the system-to-system switch and the in-system switch. When the surge voltage generated in the second system is higher than the breakdown voltage at a time when the system-to-system switch is opened, the in-system switch is opened to limit the flow of electrical current from the second power supply to the second system. When the surge voltage in the second system becomes below the breakdown voltage, the Zener diode works to cancel the limitation of the flow of electrical current between the second power supply and the second system. This restricts a drop in negative surge voltage developed in the second system before the surge voltage decreases down to the negative withstand voltages of the system-to-system switch and the in-system switch, thus preventing the voltage applied to the system-to-system switch and the in-system switch from dropping below the negative withstand voltages thereof.

The sixth means is to provide the power supply system in which a bi-directional diode is connected to the in-system switch in parallel thereto. The bi-directional diode includes a first diode and a second diode which are connected in series with each other and oriented to have opposite forward directions. The first diode has the forward direction from the junction to the second power supply and is made of said Zener diode.

The above structure is, as described above, equipped with the bi-directional diode connected to the in-system switch in parallel thereto. One of the diodes constituting the bi-directional diode which is oriented to have the forward direction from the junction to the second power supply is made of the Zener diode. In operation, when the surge voltage occurring in the second system is higher than the breakdown voltage at a time when the system-to-system switch is opened, the opened in-system switch and the rectification function of the bi-directional diode serve to stop the flow of electrical current from the second power supply to the second system. When the surge voltage in the second system becomes below the breakdown voltage, the Zener diode of the bi-directional diode loses the rectification function thereof, so that the electrical current flows from the second power supply to the second system through the bi-directional diode. This minimizes a drop in negative surge voltage developed in the second system, thereby preventing the voltage applied to the system-to-system switch from being decreased by the surge voltage below the negative withstand voltage of the in-system switch.

The seventh means is to provide the power supply system in which the above-described Zener diode includes a plurality of Zener diodes, and a bi-directional Zener diode is connected at an end thereof to one of a pair of main terminals of the in-system switch. The bi-directional Zener diode includes series-connected two of the Zener diodes which are oriented to have opposite forward directions. The bi-directional Zener diode is connected at a first end thereof to one of a pair of main terminals of the in-system switch. The bi-directional Zener diode is connected at a second end thereof to an opening/closing control terminal of the in-system switch.

The above structure is, as described above, equipped with the bi-directional Zener diode made up of two Zener diodes. The bi-directional diode has one end connected to one of the main terminals of the in-system switch and also has one end connected to the opening-closing control terminal of the in-system switch. In operation, when the surge voltage created in the second system is higher than the breakdown voltage upon opening of the system-to-system switch, the rectification function of the bi-directional Zener diode serves to keep the in-system switch opened. When the surge voltage in the second system drops below the breakdown voltage, it will cause the rectification function of one of the Zener diodes to be deactivated or disabled, so that the in-system switch is closed, thereby permitting electrical current to flow from the second power supply to the second system through the in-system switch. This prevents the negative surge voltage created in the second system from dropping, thereby avoiding a drop in voltage applied to the system-to-system switch over the withstand voltage of the in-system switch.

The eighth means is to provide the power supply system which further comprises a shut-off switch which is arranged in the connecting path closer to the second system than the system-to-system switch is and has a withstand voltage higher than that of the system-to-system switch. When the condition controller opens the system-to-system switch, the voltage drop controller first opens the shut-off switch and subsequently opens the in-system switch.

When a malfunction has occurred in the second system, achieving quick insulation between the first system which is operating properly and the second system which is malfunctioning requires a high-speed operation of the system-to-system switch. The system-to-system switch is thought of as withstanding the surge voltage generated in the second system as long as it has a high-voltage withstand ability in addition to a high-speed operation ability. The use of such a type of system-to-system switch, however, results in a risk of an increased production cost of the power supply system.

In view of the above drawback, the above structure is equipped with the shut-off switch which is arranged in the connecting path closer to the second system than the system-to-system switch is and higher in withstand voltage than the system-to-system switch. When the system-to-system switch is opened, the shut-off switch is first opened, after which the in-system switch is opened. This requires the system-to-system switch only to have the high-speed operation ability without need to have the high-voltage withstanding ability, thus resulting in a decreased production cost of the power supply system. Additionally, when the system-to-system switch is opened, the shut-off switch is opened before the in-system switch is opened, so that the shut-off switch which has the high-voltage withstanding ability avoids an excessive drop in voltage applied to the system-to-system switch although the surge voltage is generated in the second system due to the opening of the in-system switch. It is, therefore, possible to eliminate a risk of an undesirable drop in voltage applied to the system-to-system switch while the flow of electrical current from the second power supply to the second system is being limited.

The ninth means is to provide the power supply system which further comprises a first shut-off switch implemented by the above described shut-off switch and a second shut-off switch which is disposed between the junction connecting between the second power feeding path and the connecting path and the in-system switch and has a withstand voltage higher than that of the in-system switch. When the condition controller opens the system-to-system switch, the voltage drop controller works to open the second shut-off switch after the first shut-off switch is opened and before the in-system switch is opened.

The above structure is, as described above, equipped with the first shut-off switch which is arranged in the connecting path closer to the second system than the system-to-system switch is. The first shut-off switch is designed to have the withstand voltage higher than that of the system-to-system switch. The structure is also equipped with the second shut-off switch which is arranged in the second power feeding path between the above junction and the in-system switch. The second shut-off switch is higher in withstand voltage than the in-system switch. In operation, when the system-to-system switch is opened, the first shut-off switch is opened, after which the second shut-off switch is opened before the in-system switch is opened. The first shut-off switch which has the high-voltage withstanding ability, therefore, works to avoid an excessive drop in voltage applied to the system-to-system switch even though a surge voltage is generated in the second system due to the opening of the second shut-off switch. Additionally, the second shut-off switch which has the high-voltage withstanding ability works to avoid an excessive drop in voltage applied to the in-system switch. The power supply system, therefore, works to limit the flow of electrical current from the second power supply to the second system and eliminates a risk of undesirable drops in voltage applied both to the system-to-system switch and to the in-system switch.

The tenth means is to provide the power supply system in which the voltage drop controller is equipped with a Zener diode which is arranged between a second junction and a reference voltage member in connection therewith. The second junction is located in the second power feeding path between the in-system switch and a first junction that is the above described junction connecting between the second power feeding path and the connecting path. The reference voltage member develops a given reference voltage. The Zener diode of the voltage drop controller is oriented to have a forward direction from the reference voltage member toward the second junction and has a breakdown voltage lower in level than positive withstand voltages of the system-to-system switch and the in-system switch. The given reference voltage is higher in level than negative withstand voltages of the system-to-system switch and the in-system switch. When the condition controller opens the system-to-system switch, the voltage drop controller opens the in-system switch.

The above structure is, as described above, equipped with the Zener diode arranged between the second junction and the reference voltage member. The Zener diode is oriented to have the forward direction from the reference voltage member to the second junction and has a breakdown voltage lower than positive withstand voltages of the system-to-system switch and the in-system switch. This causes the rectification function of the Zener diode to be deactivated in response to a positive surge voltage being generated in the second system, thereby keeping voltages applied to the system-to-system switch and the in-system switch at the breakdown voltage of the Zener diode, which prevents the applied voltages from rising over the positive withstand voltages of the system-to-system switch and the in-system switch. The reference voltage developed by the reference voltage member is selected to be higher than the negative withstand voltages of the system-to-system switch and the in-system switch, so that the rectification function of the Zener diode serves to keep the voltages applied to the system-to-system switch and the in-system switch at the reference voltage when a negative surge voltage is developed in the second system, thereby preventing the applied voltages from being lowered below the negative withstand voltages of the system-to-system switch and the in-system switch.

BRIEF DESCRIPTION OF THE DRAWINGS

The present disclosure will be understood more fully from the detailed description given hereinbelow and from the accompanying drawings of the preferred embodiments of the invention.

In the drawings:

FIGS. 14(A)-14(I) is a time chart which demonstrates an example of a control task in a modification of the third embodiment;

FIGS. 16(A)-16(H) is a time chart which demonstrates an example of a control task executed in the fourth embodiment.

MODE FOR CARRYING OUT THE INVENTION

First Embodiment

The power supply system 100 designed as a vehicle-mounted power supply system according to the first embodiment will be described below with reference to the drawings.

Figure 1:
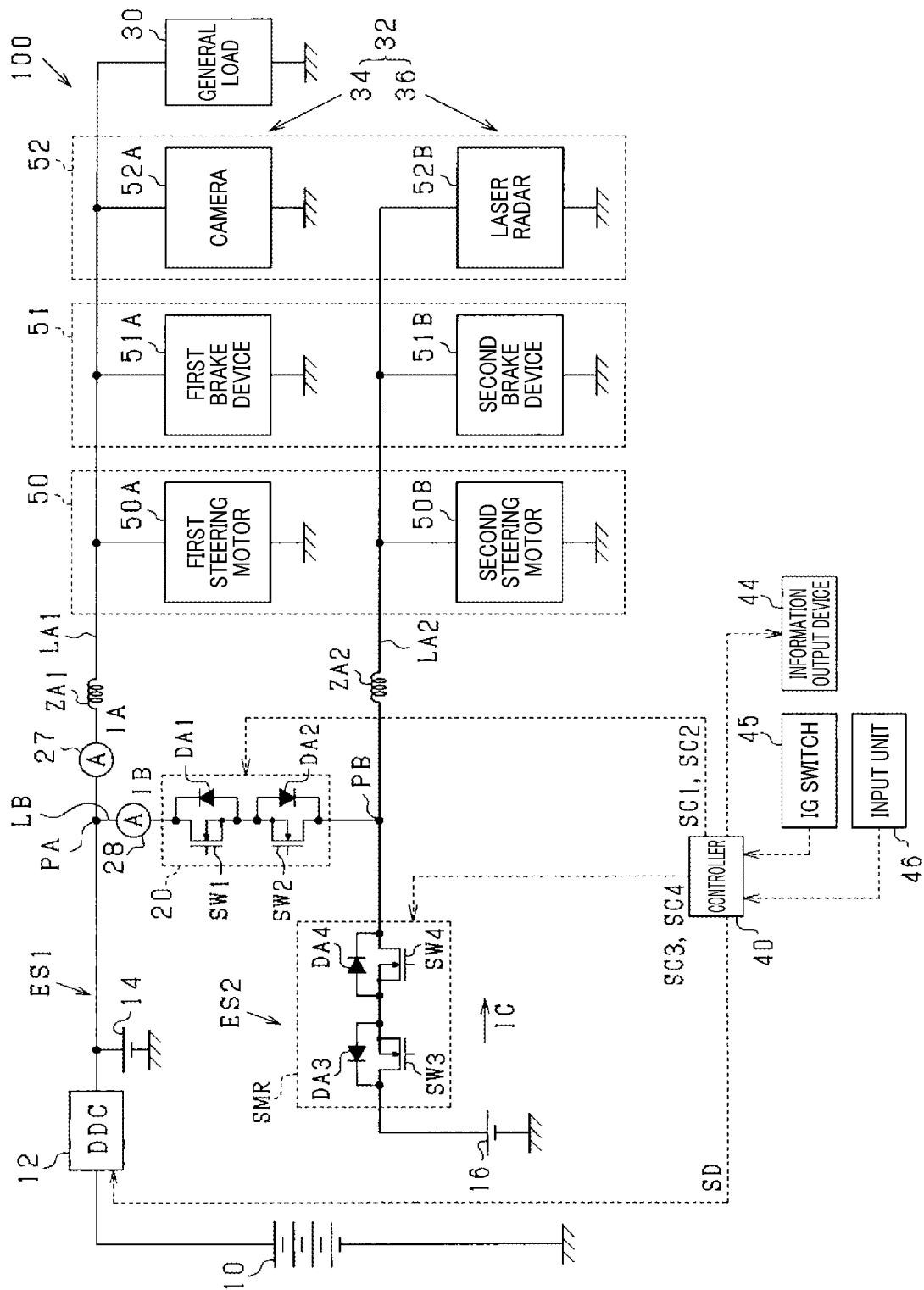
FIG. 1 is a view which illustrates the overall structure of a power supply system according to the first embodiment.

The power supply system 100 is, as can be seen in FIG. 1, designed to deliver electrical power to the general loads 30 and the special loads 32. The power supply system 100 includes the high-voltage battery 10, the DC-to-DC converter (which will be referred to merely as converter) 12, the first storage battery 14, the second storage battery 16, the switching unit 20, the relay switch SMR (i.e., system main relay switch), and the controller 40.

The high-voltage battery 10 has a rating of, for example, several hundreds of volts which is higher than those of the first and second storage batteries 14 and 16. The high-voltage battery 10 is implemented by, for example, a lithium-ion battery. The converter 12 works as a voltage generator to convert electrical power delivered from the high-voltage battery 10 to electrical power at the power-supply voltage VA and feeds it to the general loads 30 and the special loads 32. In this embodiment, the power-supply voltage VA is selected to be a voltage enabling each of the general loads 30 and the special loads 32 to work.

The general loads 30 are electrical loads (which will be referred to merely as loads) which are not used to control an operation of a mobile object, such as an automotive vehicle. For example, the general loads 30 are implemented by an air conditioner, an audio device, and a power window.

The special loads 32 are electrical loads designed to perform at least one function for controlling the operation of the vehicle. The special loads 32 include, for example, electronic power assisted steering device 50 working to control a steering operation of the vehicle, the electric brake device 51 working to exert a brake force on a wheel of the vehicle, and the cruise control device 52 working to monitor a condition surrounding the vehicle. The special loads 32 will also be referred to merely as electrical loads.

If failures in operation of the special loads 32 occur, so that the special loads 32 are disabled from performing all the functions thereof, it will become impossible to control the operation of the vehicle. In order not to lose all the functions due to the malfunctions of the special loads 32, the power supply system 100 is equipped with the first loads 34 and the second loads 36 provided as redundancy devices for the functions, respectively. Specifically, the electronic power assisted steering device 50 includes the first steering motor 50A and the second steering motor 50B. The electric brake device 51 includes the first brake device 51A and the second brake device 51B. The cruise control device 52 includes the camera 52A and the laser radar 52B. The first steering motor 50A, the first brake device 51A, and the camera 52A constitute the first loads 34. The second steering motor 50B, the second brake device 51B, and the laser radar 52B constitute the second loads 36.

A combination of each of the first loads 34 and a corresponding one of the second loads 36 is designed to perform one of the functions, but however, each of the first loads 34 and the second loads 34 is operable to perform one of the functions by itself completely. For instance, the electronic power assisted steering device 50 works to control required steering of the vehicle using the first steering motor 50A and the second steering motor 50B. In other words, the first and second steering motors 50A and 50B work to steer the vehicle within a given range of a steering rate and a given range of a steering angle Each of the special loads 32 works to perform a function to assist a driver in controlling the vehicle in a manual mode of operation of the vehicle. Each of the special loads 32 also works to perform a function required in a self-driving mode of the vehicle to automatically control driving or stopping vehicle. In other words, the special loads 32 serve as loads which perform at least one function required to drive the vehicle.

The first loads 34 connect with the converter 12 through the first channel path LAL. The converter 12 delivers electrical power to the first loads 34 through the first channel path LAL. The first storage battery 14 and the general loads 30 connect with the first channel path LAL. The first storage battery 14 is implemented by, for example, a lead-acid battery. In this embodiment, the converter 12, the first storage battery 14, the general loads 30, and the first loads 34 which are connected together through the first channel path LA1 constitute the first system ES1. The first channel path LA1 has arranged therein the inductance EA1 created by the first system ES1. In this embodiment, the first channel path LA1 serves as a first power feeding path. The high-voltage battery 10 and the converter 12 serve as a first power supply.

The second loads 36 connect with the second storage battery 16 through the second channel path LA2. The second storage battery 16 delivers electrical power to the second loads 36 through the second channel path LA2. The second storage battery 16 is implemented by, for example, a lithium-ion battery. In this embodiment, the second storage battery 16 and the second loads 36 which are connected together through the second channel path LA2 constitute the second system ES2. The second channel path LA2 has disposed therein the inductance ZA2 created by the second system ES2. In this embodiment, the second channel path LA2 serves as a second power feeding path. The second storage battery 16 serves as a second power supply.

The switching unit 20 is disposed in the connecting path LB which achieves connection between the first channel path LA1 and the second channel path LA2. The connecting path LB connects at an end, i.e., the junction PA with the first channel path LA1 and at the other end, i.e., the junction PB with the second channel path LA2. The switching unit 20 includes the first switch SW1 and the second switch SW2 which are connected in series with each other. The first switch SW1 is arranged closer to the first system ES1 than the second switch SW2 is. The first switch SW1 and the second switch SW2 serve as a system-to-system switch.

In this embodiment, each of the first and second switches SW1 and SW2 is made of an N-channel MOSFET (which will be referred to simply as MOSFET). The first switch SW1, therefore, has the first parasitic diode (also called body diode) DA1 connected parallel thereto. Similarly, the second switch SW2 has the second parasitic diode (also called body diode) DA2 connected parallel thereto. The first and second switches SW1 and SW2 are connected to have the first and second parasitic diodes DA1 and DA2 oriented in directions opposite to each other. Specifically, the first parasitic diode DA1 is oriented to have an anode disposed closer to the second system ES2 and a cathode disposed closer to the first system ES1. The second parasitic diode DA2 is oriented to have an anode disposed closer to the first system ES1 and a cathode disposed closer to the second system ES2.

The first channel path LA1 has the first current detector 27 arranged therein. The connecting path LB has the second current detector 28 arranged therein. The first current detector 27 is disposed between the junction PA and the first loads 34 in the first channel path LA1 and works to measure the intensity and flow direction of the in-first system current IA flowing therethrough. The second current detector 28 is disposed closer to the first system ES1 than the switching unit 20 is in the connecting path LB and works to measure the intensity and direction of the system-to-system current IB flowing therethrough.

The relay switch SMR is arranged between the junction PB and the second storage battery 16 in the second channel path LA2 and turned on or off to open or close the second channel path LA2. The on-off operation of the relay switch SMR is to control electrical current flowing from the second storage battery 16 to the second system ES2.

The controller 40 produces the first and second switching signals SC1 and SC2 as a function of outputs from the first and second current detectors 27 and 28 and outputs them to the first and second switches SW1 and SW2 to turn on or off the first and second switches SW1 and SW2. The controller 40 also produces and outputs the control signal SD to the converter 12 to control the operation of the converter 12. The converter 12 is responsive to the control signal SD to be activated or deactivated.

The controller 40 connects with the information output device 44, the IG switch 45, and the input unit 46 to control operations thereof. The information output device 44 is a device which visually or acoustically output information to the driver of the vehicle and implemented by, for example, a display or an audio speaker mounted in a passenger compartment of the vehicle. The IG switch 45 is a start switch for the vehicle. The controller 40 monitors an on- or off-state of the IG switch. The input unit 46 is a device into which driver's operation or effort is inputted and implemented by a steering wheel, a lever, a button, a pedal, or an audio input device.

The controller 40 works to manually or automatically operates the vehicle using the special loads 32. The controller 40 includes a known microcomputer made up of a CPU, a ROM, a RAM, and flash memories. The CPU executes a variety of tasks required in the manual drive mode or the autonomous drive mode by look-up using arithmetic programs or control data stored in the ROM.

The manual drive mode is a drive control mode in which the vehicle is operated manually by the driver using the input unit 46. The autonomous drive mode is a drive control mode in which the vehicle is operated automatically by means of given control tasks executed by the controller 40 independent of the driver. Specifically, the autonomous drive mode, as referred to herein, an autonomous driving mode of 3 or more within the levels of 0 to 5 levels of driving automation defined by the National Highway Traffic Safety Administration (NHTSA). The level 3 of driving automation is to control both steering of the vehicle and acceleration or deceleration of the vehicle by the controller 40 while sensing the external environment of the vehicle.

When the first and second switches SW1 and SW2 are opened due to a malfunction of the second system ES2, the relay switch SMR in the second system ES2 is opened to avoid over-discharge of the second storage battery. An abrupt drop in an in-second system current IC flowing from the second storage battery 16 to the second system ES2 due to the opening of the relay switch SMR will, however, result in generation of a negative surge voltage VS in the inductance ZA2 of the second system ES2 (which will be referred to simply as the second system ES2. When the surge voltage VS becomes lower than the negative withstand voltage Vth that is a withstand voltage at negative voltage sides of the first and second switches SW1 and SW2, it will result in a failure in electrical insulation between the first system ES1 operating properly and the second system ES2 malfunctioning by means of the first and second switches SW1 and SW2, which leads to a risk that the first loads 34 in the first system ES1 may operate improperly.

This embodiment is designed to control the opening or closing the relay switch SMR when the first and second switches SW1 and SW2 are opened in a control task, thereby controlling or reducing the in-second system current IC and also to minimize a negative spike in voltage applied to the first and second switches SW1 and SW2 which arises from the surge voltage VS created in the second system ES2 due to the reduction in the in-second system current IC. Specifically, when the first and second switches SW1 and SW2 are opened, the opening or closing of the relay switch SMR is controlled to reduce the in-second system current IC and also to decrease a rate at which the in-second system current IC drops, thereby preventing the voltage applied to the first and second switches SW1 and SW2 from dropping below the negative withstand voltage Vt of the first and second switches SW1 and SW2 due to the surge voltage VS.

The relay switch SMR includes the third switch SW3 and the fourth switch SW4 which are connected in series with each other. The third switch SW3 is located closer to the second storage battery 16 than the fourth switch SW4 is. The relay switch SMR works as an in-system switch. The third switch SW3 works as a second in-system switch. The fourth switch SW4 works as a first in-system switch.

In this embodiment, each of the third and fourth switches SW3 and SW4 is implemented by a MOSFET. The third switch SW3, therefore, has the third parasitic diode DA3 connected parallel thereto. Similarly, the fourth switch SW4 has the fourth parasitic diode DA4 connected parallel thereto. The third and fourth switches SW3 and SW4 are connected in series to have the third and fourth parasitic diodes DA3 and DA4 oriented in directions opposite to each other. Specifically, the third parasitic diode DA3 is oriented to have an anode disposed closer to the junction PB and a cathode disposed closer to the second storage battery 16. The fourth parasitic diode DA4 is oriented to have an anode disposed closer to the second storage battery 16 and a cathode disposed closer to the junction PB. In other words, the fourth parasitic diode DA4 is oriented to have a forward direction from second storage battery 16 to the junction PB.

The controller 40 produces and outputs the third and fourth switching signals SC3 and SC4 to the third and fourth switches SW3 and SW4 to turn on or off the third and fourth switches SW3 and SW4. In the control task, when the first and second switches SW1 and SW2 are opened, the on-off operation of the relay switch SMR is executed by closing the third switch SW3 and opening the fourth switch SW4.

The in-second system current IC, therefore, flows through the third switch SW3 and the fourth parasitic diode DA4, so that the forward-voltage VE, as developed by the fourth parasitic diode DA4, serves to limit the in-second system current IC. This minimizes a risk of over-discharge of the second storage battery 16. The surge voltage VS is usually generated in the second system ES2 due to the limitation of the in-second system current IC, but however, such limitation of the in-second system current IC achieved by the fourth parasitic diode DA4 is small, thus resulting in a low rate of decrease in the in-second system current IC. This enables the third and fourth switches SW3 and SW4 to be operated properly regardless of generation of the surge voltage VS in the second system ES2 due to the imitation of the in-second system current IC, thereby ensuring the stability in delivering the electrical power to the first loads 34 in the presence of a malfunction of the second system ES2.

Figure 2:
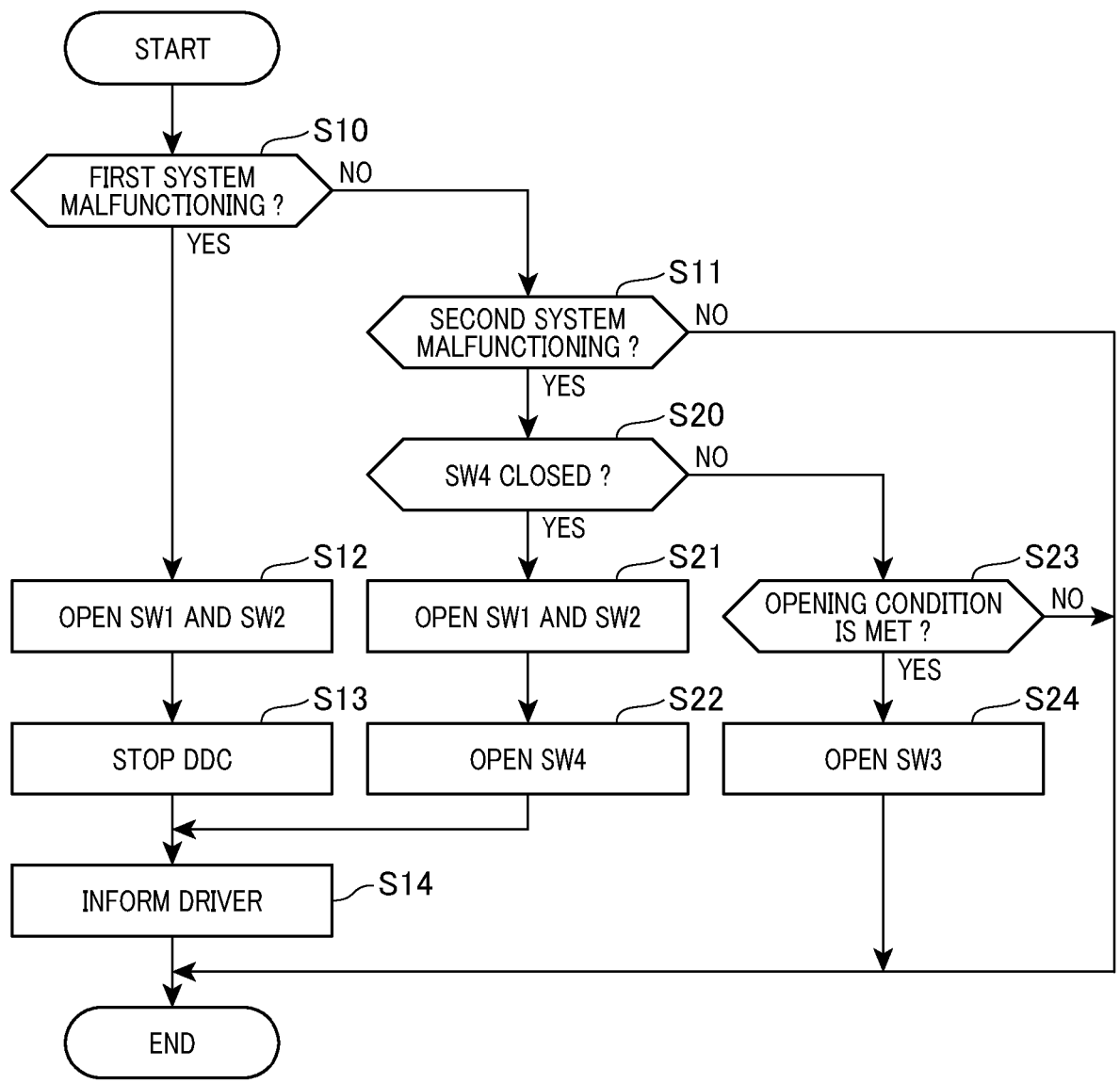
FIG. 2 is a flowchart of a sequence of steps to execute a control task in the first embodiment.

FIG. 2 is a flowchart of a sequence of steps performed in the control task in this embodiment. Upon closing the IG switch 45, the controller 40 executes the control task cyclically at a given control interval. In the closed state of the IG switch 45, the first to fourth switches SW1 to SW4 are all closed, so that the converter 12 is operating.

Upon execution of the control task, the routine proceeds to step S10 in which it is determined whether the first system E1 is malfunctioning. If a NO answer is obtained in step S10, then the routine proceeds to step S11 in which it is determined whether the second system ES2 is malfunctioning. The operation in step S11 constitutes a malfunction determiner. In this embodiment, the malfunction includes a failure in a power supply operation arising from, for example, a ground fault or a wire disconnection.

The occurrence of the malfunction may be found as a function of the intensity of each of the current IA and IB measured by the first and second current detectors 27 and 28. For instance, when the ground fault has occurred in the first system ES1, the intensity of the in-first system current IA measured by the first current detector 27 will be higher than or equal to a current threshold Ith prepared for determining the ground fault. Similarly, when the ground fault has occurred in the second system ES2, the intensity of the system-to-system current IB measured by the second current detector 28 will be higher than or equal to the current threshold Ith. The determination of which of the first and second systems ES1 and ES2 is malfunctioning may be made by measuring the intensities of the currents IA and IB using the first and second current detectors 27 and 28.

If it is determined that neither of the first and second systems ES1 and ES2 is malfunctioning, that is, if a NO answer is obtained in step S11, then the routine terminates. The converter 12 and the first and second storage batteries 14 and 16, therefore, work to supply electrical power to the first and second loads 34 and 36 in a redundancy mode, thereby enabling the first and second loads 34 and 36 to work together to execute one of the functions which is required to achieve the drive control mode.

Alternatively, if either of the first and second systems ES1 and ES2 is determined to be malfunctioning, the supply of electrical power to one of the first and second systems ES1 and ES2 which is malfunctioning is stopped, while the electrical power continues to be delivered to the electrical loads of the other of the first and second systems ES1 and ES2 which is operating properly.

Specifically, if a YES answer is obtained in step S10, then the routine proceeds to step S12 wherein the first and second switches SW1 and SW2 are opened. The first and second switches SW1 and SW2 are capable of being turned on or off at high speeds. Such a high-speed on-off operation of the first and second switches SW1 and SW2 enables the first system ES1 which is malfunctioning and the second system ES2 which is operating properly to be electrically isolated quickly from each other.

Subsequently, the routine proceeds to step S13 wherein an instruction to deactivate the converter 12 is outputted. The routine proceeds to step S14. The deactivation of the converter 12 will result in a rapid decrease in current flowing from the converter 12 to the first system ES1, which generates the negative surge voltage VS at the inductance ZA1 in the first system ES1. In order to alleviate adverse effects arising from the negative surge voltage VS, the routine proceeds to step S13 wherein the state of the converter 12 is controlled to gradually decrease the current flowing from the converter 12 to the first system ES1 to keep the voltage applied to the first and second switches SW1 and SW2 above the negative withstand voltage Vth of the first and second switches SW1 and SW2.

The routine proceeds to step S14 wherein the information output device 44 is activated to inform the driver of the fact that a malfunction occurs in one of the first system ES1 and the second system ES2. The routine then terminates.

If a YES answer is obtained in step S11, then the routine proceeds to step S20 wherein it is determined whether the fourth switch SW4 is closed or not. If a YES answer is obtained, then the routine proceeds to step S21. Alternatively, if a NO answer is obtained, then the routine proceeds to step S23.

In step S21, the first and second switches SW1 and SW2 are opened. The routine proceeds to step S22 wherein only the fourth switch SW4 of the relay switch SMR is opened. The routine proceeds to step S14. When the first and second switches SW1 and SW2 are opened, it will result in generation of the negative surge voltage VS in the second system ES2, which causes the in-second system current IC to flow through the third switch SW3 and the fourth parasitic diode DA4. The operation in step S20 constitutes a condition controller. The operation in step S22 constitutes a voltage drop controller.

In step S23 entered when the fourth switch SW4 has been opened in a previous cycle of execution of the control task, it is determined whether a switch-opening condition required for the third switch SW3 to be opened is met or not. The switch-opening condition is a condition where the length of time elapsed from when the fourth switch SW4 is opened is longer than a given time threshold Yth or where the temperature of the second storage battery 16 is higher than a given temperature threshold Tth.

If a NO answer is obtained in step S23 meaning that the switch-opening condition is not met, then the routine terminates. Alternatively, if a YES answer is obtained, then the routine proceeds to step S24 wherein the fourth switch SW4 is opened, in other words, the relay switch SMR is opened. The routine then terminates.

FIGS. 3(A) to 3(G) demonstrate an example of the control task. FIGS. 3(F) to 3(G) show changes in the load voltage VD and the in-second system current IC when a malfunction of the second system ES2 occurs due to the ground fault during traveling of the vehicle. The load voltage VD is voltage applied to the second loads 36. Specifically, the load voltage VD is voltage appearing at the junction PB in the second system ES2. The load voltage VD will, therefore, be identical with the power-supply voltage VA before the ground fault occurs in the second system ES2, while it will be identical with the surge voltage VS after the ground fault occurs in the second system ES2. In this embodiment, the load voltage VD is an example of applied voltage which will be described below.

FIG. 3(A) represents an on-off operation of the IG switch 45. FIG. 3(B) represents the on-off operation of the first switch SW1. FIG. 3(C) represents the on-off operation of the second switch SW2. FIG. 3(D) represents the on-off operation of the third switch SW3. FIG. 3(E) represents the on-off operation of the fourth switch SW4. FIG. 3(F) represents a change in load voltage VD. FIG. 3(G) represents a change in in-second system current IC.

In a period of time the IG switch 45 is kept opened before time t1, in other words, the power supply system 100 is in the off-state, the first to fourth switches SW1 to SW4 are kept in the open state, so that the converter 12 is placed in the off-state. This causes the load voltage VD and the in-second system current IC to be kept zero as long as the IG switch 45 is opened.

Upon closing of the IG switch 45 at time t1, the first and second switches SW1 and SW2 are closed. An instruction to turn on the converter 12 is outputted, so that the converter 12 is activated. The load voltage VD then rises up to a given operating voltage VM with a rise in the power-supply voltage VA, thereby enabling the vehicle to travel. The operating voltage VM is a voltage within a range of drive voltage for the first and second loads 34 and 36.

At time t1, the third and fourth switches SW3 and SW4 are also closed. This causes the electrical power to be outputted from the converter 12 to charge the second storage battery 16. The in-second system current IC is, as described above, an electrical current flowing from the second storage battery 16 to the second system ES2 and will become negative when the second storage battery 16 is charged.

When the vehicle is moving, a determination is made as to whether a malfunction has occurred in either of the first system ES1 or the second system ES2. If it is determined that the ground fault is occurring in neither of the first and second systems ES1 and ES2, the first to fourth switches SW1 to SW4 are kept closed. This enables the electrical power to be delivered from the converter 12 and the first storage battery 14 to the first and second loads 34 and 36. The supply of electrical power from the converter 12 ensures the continuity of delivery of electrical power to the first and second loads 34 and 36 in the autonomous drive mode for a long period of time. The supply of electrical power from the first storage battery 14 to the first and second loads 34 and 36 results in a decreased variation in voltage of the electrical power delivered to the first and second loads 34 and 36. This enables the vehicle to be moved in the manual or autonomous drive mode using the first and second loads 34 and 36 between time t1 and time t2.

Figure 3:
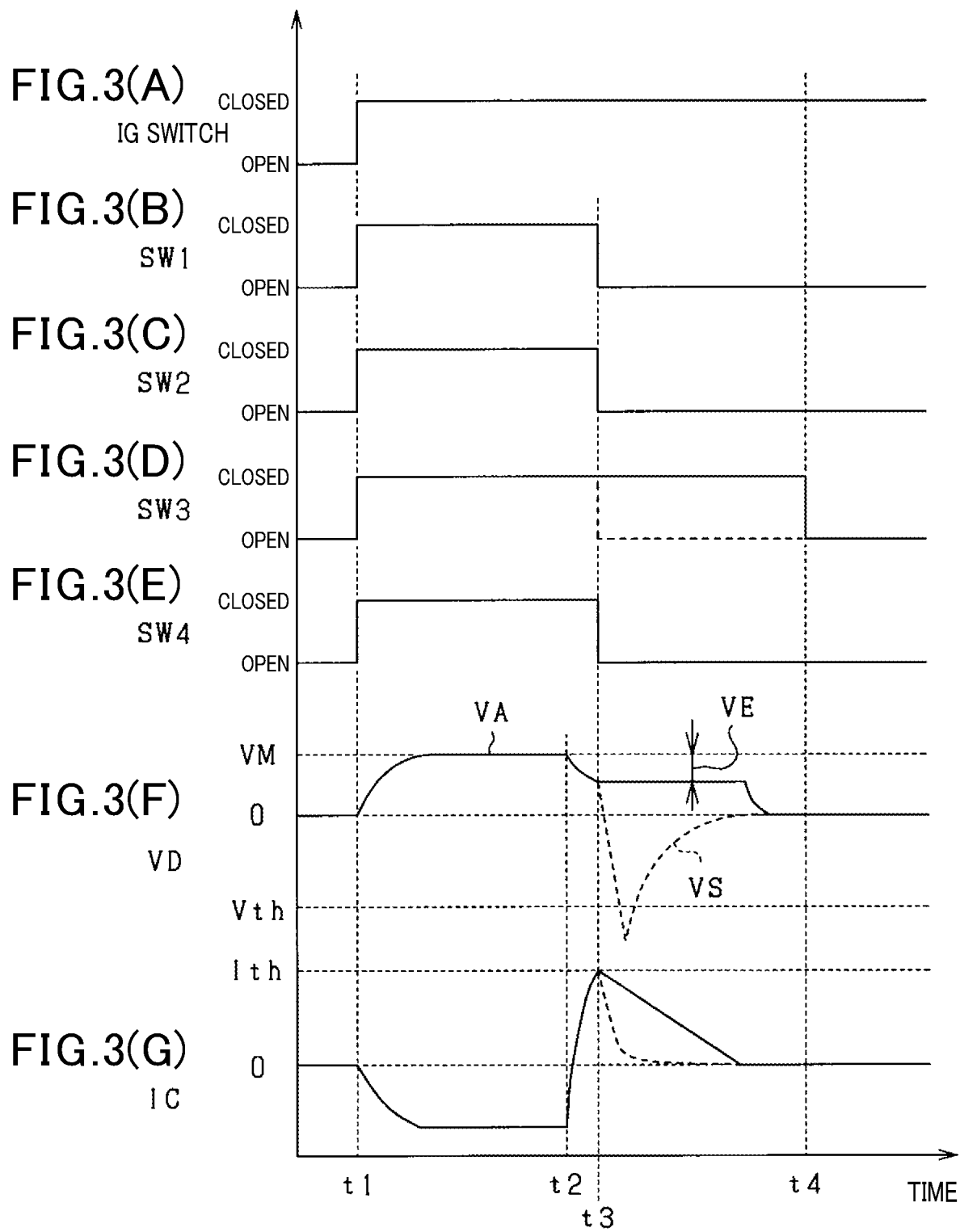
FIGS. 3(A)-3(G) is a time chart which demonstrates an example of a control task in the first embodiment.

When it is determined that the ground fault has occurred in one of the first and second systems ES1 and ES2, the on-off operations of the first to fourth switches SW1 to SW4 are controlled. In the example of FIG. 3, the ground fault arises in the second system ES2 at time t2, thereby resulting in a decrease in the load voltage VD.

The system-to-system current IB also arises. Subsequently, at time t3, the system-to-system current IB becomes higher than or equal to the current threshold Ith, so that the ground fault is determined to have occurred in the second system ES2. The first and second switches SW1 and SW2 are, therefore, opened at time t3. This electrically insulates between the first system ES1 which is subjected to no ground fault and the second system ES2 which is undergoing the ground fault, thereby ensuring the stability in delivering electrical power to the first loads 34 in the first system ES1.

Additionally, at time t3, in order to avoid the overdischarge of the second storage battery 16, the on-off operations of the third and fourth switches SW3 and SW4 are controlled to limit the in-second system current IC. This will result in generation of the surge voltage VS in the second system ES2. If the third and fourth switches SW3 and SW4 are both opened at time t3 in order to avoid the over-discharge of the second storage battery 16, it usually causes, as denoted by broken lines in FIGS. 3(D) and 3(G), the in-second system current IC to rapidly drops. The intensity of the surge voltage VS occurring in the second system ES2 is usually proportional to a rate at which the current flowing in the second system ES2 decreases. A rapid decrease in the in-second system current IC, therefore, causes the load voltage VD, as indicated by a broken line in FIG. 3(F), to be lower than the negative withstand voltage Vth of the first and second switches SW1 and SW2, thereby resulting in a failure of the first and second switches SW1 and SW2 in electrically isolate between the first system ES1 which is subjected to no ground fault and the second system ES2 which is undergoing the ground fault.

In order to alleviate the above drawback, this embodiment is, as illustrated in FIGS. 3(C) and 3(D), designed to open only the fourth switch SW4 of the relay switch SMR at time t3. This causes the in-second system current IC to flow through the third switch SW3 and the fourth parasitic diode DA4, so that the in-second system current IC is limited by the forward voltage VE at the fourth parasitic diode DA4, thereby minimizing the over-discharge of the second storage battery 16.

The degree to which the in-second system current IC is limited by the fourth parasitic diode DA4 is relatively low, so that the in-second system current IC is decreased by the above limitation achieved by the fourth parasitic diode DA4, but the rate at which the in-second system current IC drops is slowed (see the solid line in FIG. 3(G)). This controls or avoids an excessive drop in the surge voltage VS, thereby preventing, as indicated by the solid line in FIG. 3(F), the load voltage VD from being lowered below the negative withstand voltage Vth of the first and second switches SW1 and SW2.

Afterwards, when the switch-opening condition for the third switch SW3 at time t4, the third switch SW3 is opened.

This embodiment offers the following beneficial advantages.

In response to occurrence of a malfunction in the second system ES2, the first and second switches SW1 and SW2 are, as described above, opened to electrically insulate between the first system ES1 which is operating properly and the second system ES2 which is malfunctioning. Specifically, when the first and second switches SW1 and SW2 are opened, the open or closed states of the third and fourth switches SW3 and SW4 are controlled to control or limit the flow rate of the in-second system current IC, thereby minimizing an excessive or undesirable drop in load voltage VD although the surge voltage VS generates in the second system ES2. The limitation of the flow rate of the in-second system current IC avoids the over-discharge of the second storage battery 16. The minimization of the excessive drop in load voltage VD arising from the surge voltage VS also ensures the stability in operating the first and second switches SW1 and SW2 although the surge voltage VS occurs in the second system ES2. This achieves required delivery of electrical power to the first loads 34 in the first system ES1.

The limitation of the in-second system current IC is, as described above, achieved by controlling the opening or closing of the third and fourth switches SW3 and SW4 to reduce the rate at which the in-second system current IC decreases. The intensity of the surge voltage VS arising in the second system ES2 is proportional to a rate of decrease in electrical current which contains the in-second system current IC and flows in the second system ES2. The reduced rate of decrease in the in-second system current IC, therefore, reduces the surge voltage VS occurring in the second system ES2, thereby minimizing or avoiding an undesirable drop in load voltage VD usually generated by the surge voltage VS.

Specifically, when the first and second switches SW1 and SW2 are opened, the fourth switch SW4 is, as described already, opened, while the third switch SW3 is closed. The generation of the negative surge voltage VS in the second system ES2, therefore, causes the in-second system current IC to flow through the third switch SW3 and the fourth parasitic diode DA4. The forward voltage EV developed at the fourth parasitic diode DA4, then, serves to reduce the rate of decrease in electrical current flowing in the second system ES2, thereby minimizing an undesirable drop in load voltage VD.

Modification of First Embodiment

The reduction in rate of decrease in the in-second system current IC may be achieved by controlling a duty cycle of a switching signal for the third switch SW3 between times t3 and t4. The duty cycle, as referred to herein, is defined as a ratio of a closed duration of the third switch SW3 to a total cyclic period of the switching signal in the form of a percentage.

Figure 4:
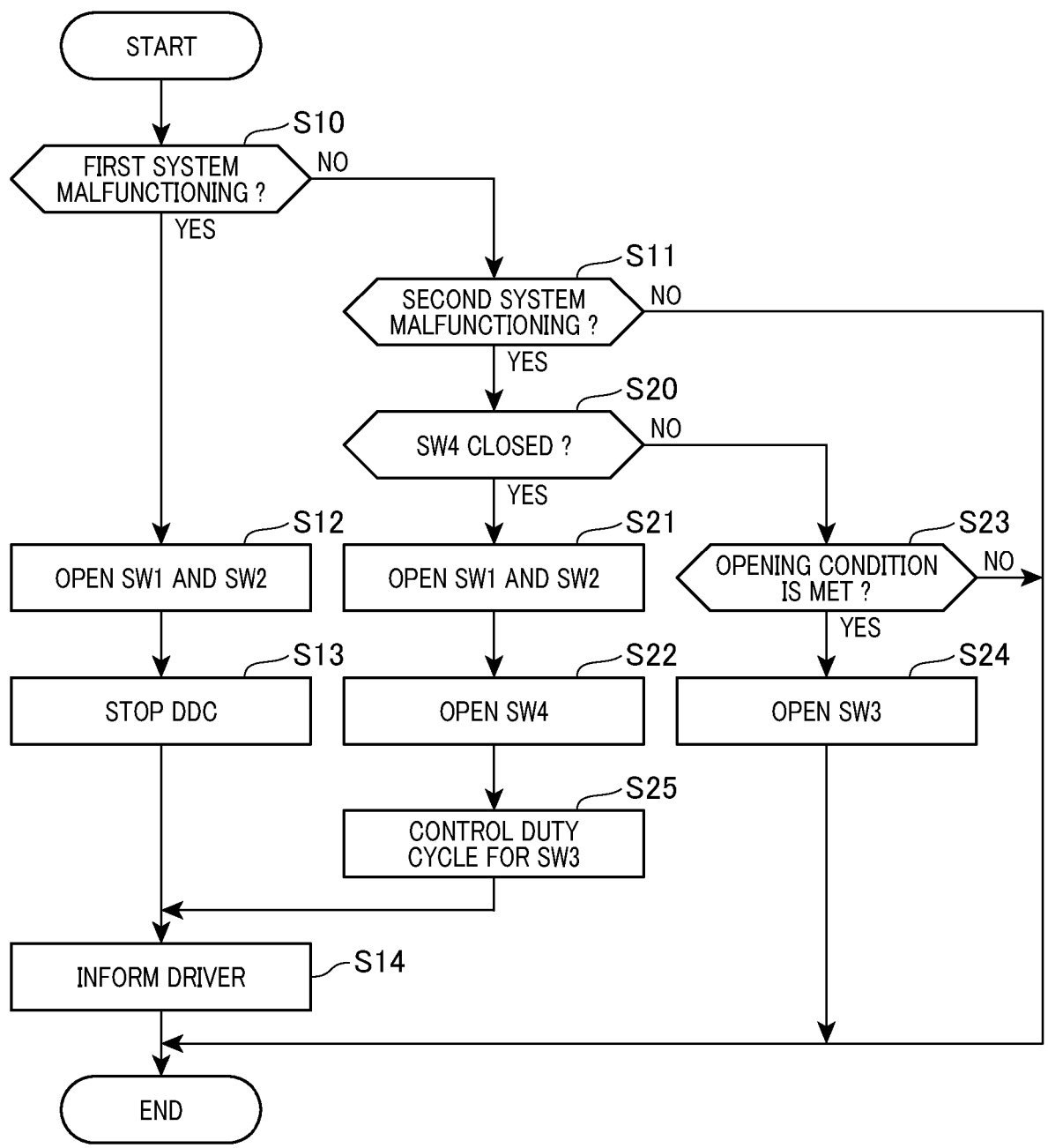
FIG. 4 is a flowchart of a sequence of steps to execute a control task in a modification of the first embodiment.

Specifically, as illustrated in a flowchart of FIG. 4, after step S22 wherein the fourth switch SW4 is opened, the routine proceeds to step S25 wherein the duty cycle of the switching signal outputted to the third switch SW3 is controlled. The routine then proceeds to step S14. Specifically, the duty cycle for the third switch SW3 is decreased with an increase in time elapsed from time t3. Simultaneously, the rate of decrease in the duty cycle is also decreased. In other words, the duty cycle is decreased gradually. This results in a reduction in rate of decrease in current flowing in the second system ES2, thereby minimizing an undesirable drop in load voltage VD.

Second Embodiment

The second embodiment will be described below in terms of differences between itself and the first embodiment with reference to FIGS. 5 to 7(G).

Figure 5:
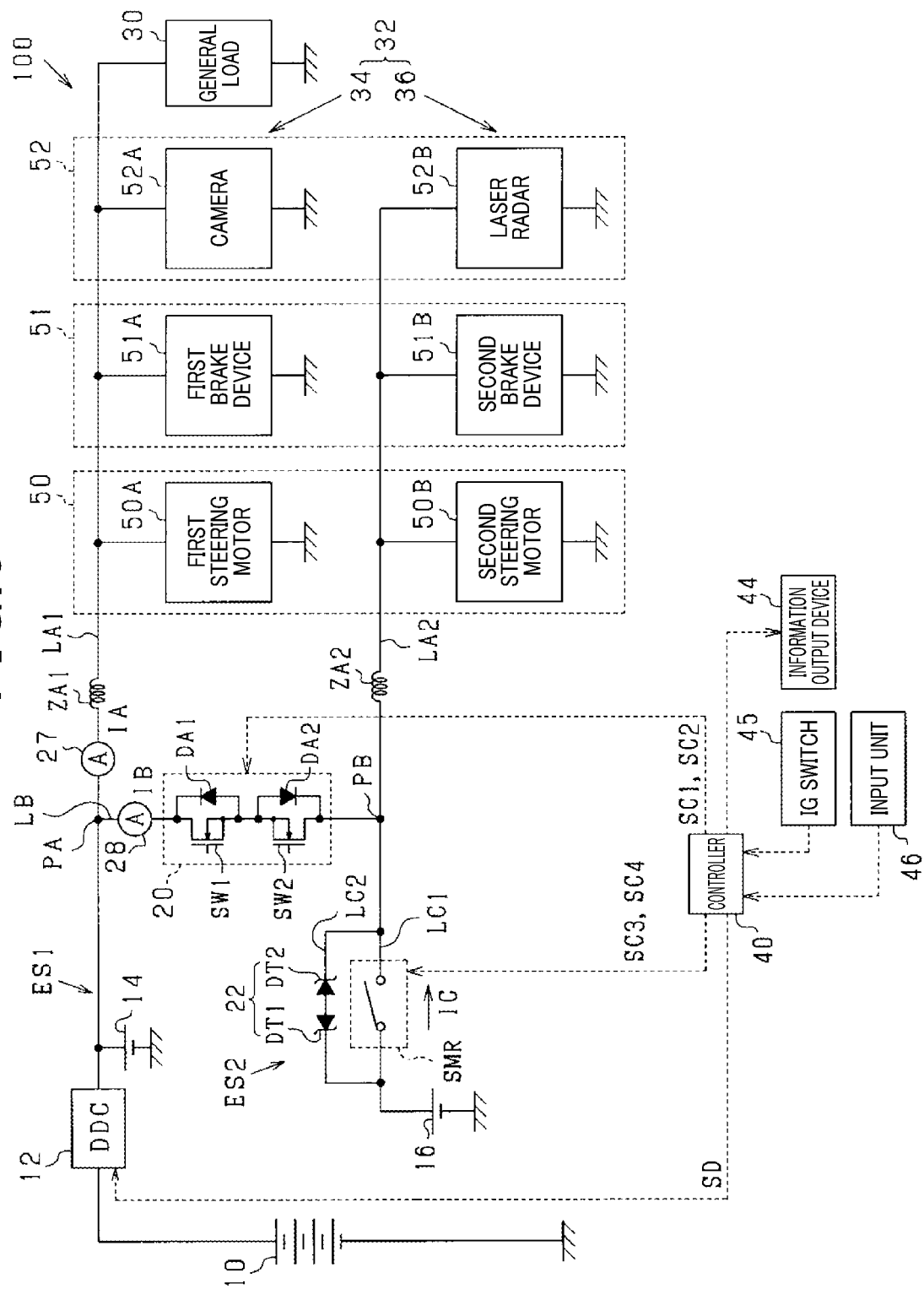
FIG. 5 is a view which illustrates the entire structure of a power supply system according to the second embodiment.

This embodiment is different from the first embodiment in that the bi-directional Zener diode 22 is connected in parallel to the relay switch SMR. The first path LC1 and the second path LC2 are, as illustrated in FIG. 5, arranged in parallel to each other between the junction PB and the second storage battery 16 in the second system ES2. The relay switch SMR is arranged in the first path LC1. The bi-directional Zener diode 22 is arranged in the second path LC2. The relay switch SMR is illustrated in a simplified fashion in FIG. 5. The bi-directional Zener diode 22 will also be referred to as a bi-directional diode.

The bi-directional Zener diode 22 includes the first Zener diode (which will be referred to below as first Zener) DT1 and the second Zener diode (which will be referred to below as second Zener) DT2. The first and second Zeners DT1 and DT2 are connected in series with each other and oriented in opposite directions. Specifically, the first Zener DT1 is disposed closer to the second storage battery 16 than the second Zener DT2. The first Zener DT1 has an anode located close to the junction PB and a cathode located close to the second storage battery 16. The second Zener DT2 is arranged to have an anode located close to the second storage battery 16 and a cathode located close to the junction PB. In other words, the first Zener DT1 is oriented to have a forward direction from the junction PB toward the second storage battery 16.

The first and second Zeners DT1 and DT2 have the same breakdown voltage VZ. In this embodiment, the breakdown voltage VZ of the first and second Zeners DT1 and DT2 is selected to be higher than the negative withstand voltage Vth of the first and second switches SW1 and SW2 and the negative withstand voltage Vth of the third and fourth switches SW3 and SW4. In the following discussion, the negative withstand voltage Vth of the first and second switches SW1 and SW2 will be referred to as the first negative withstand voltage Vth1, and the negative withstand voltage Vth of the third and fourth switches SW3 and SW4 will be referred to as the second negative withstand voltage Vth2.

Figure 6:
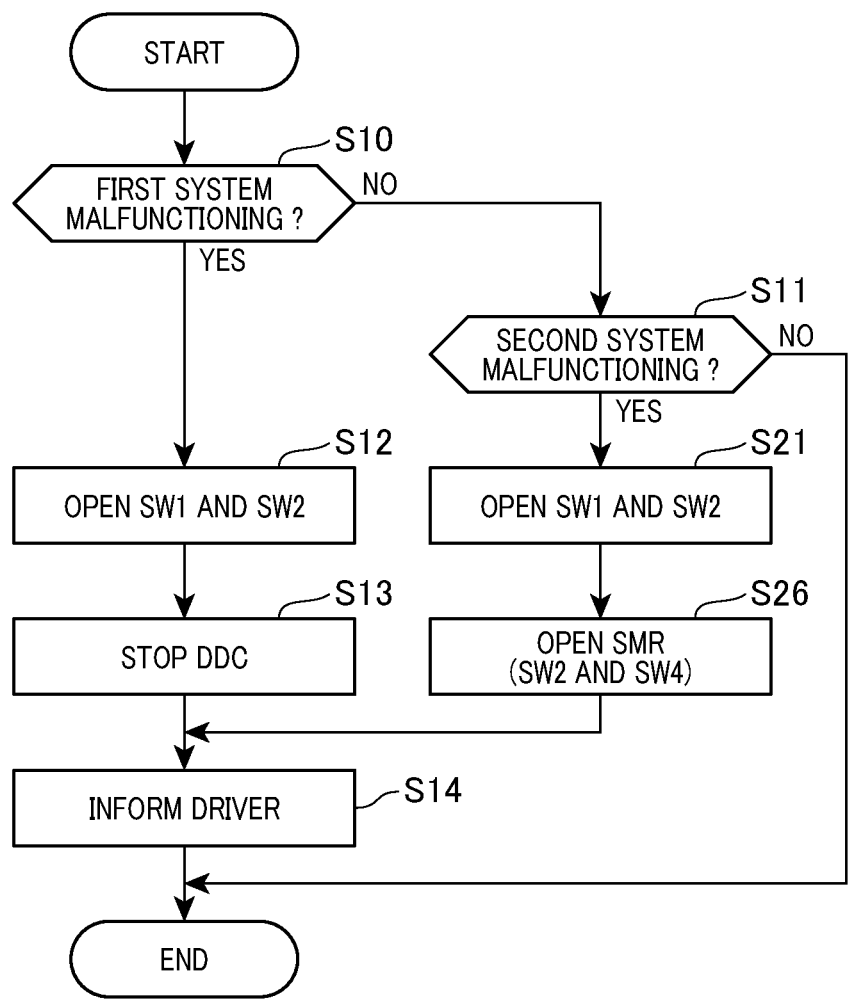
FIG. 6 is a flowchart of a sequence of steps to execute a control task in the second embodiment.
Figure 7:
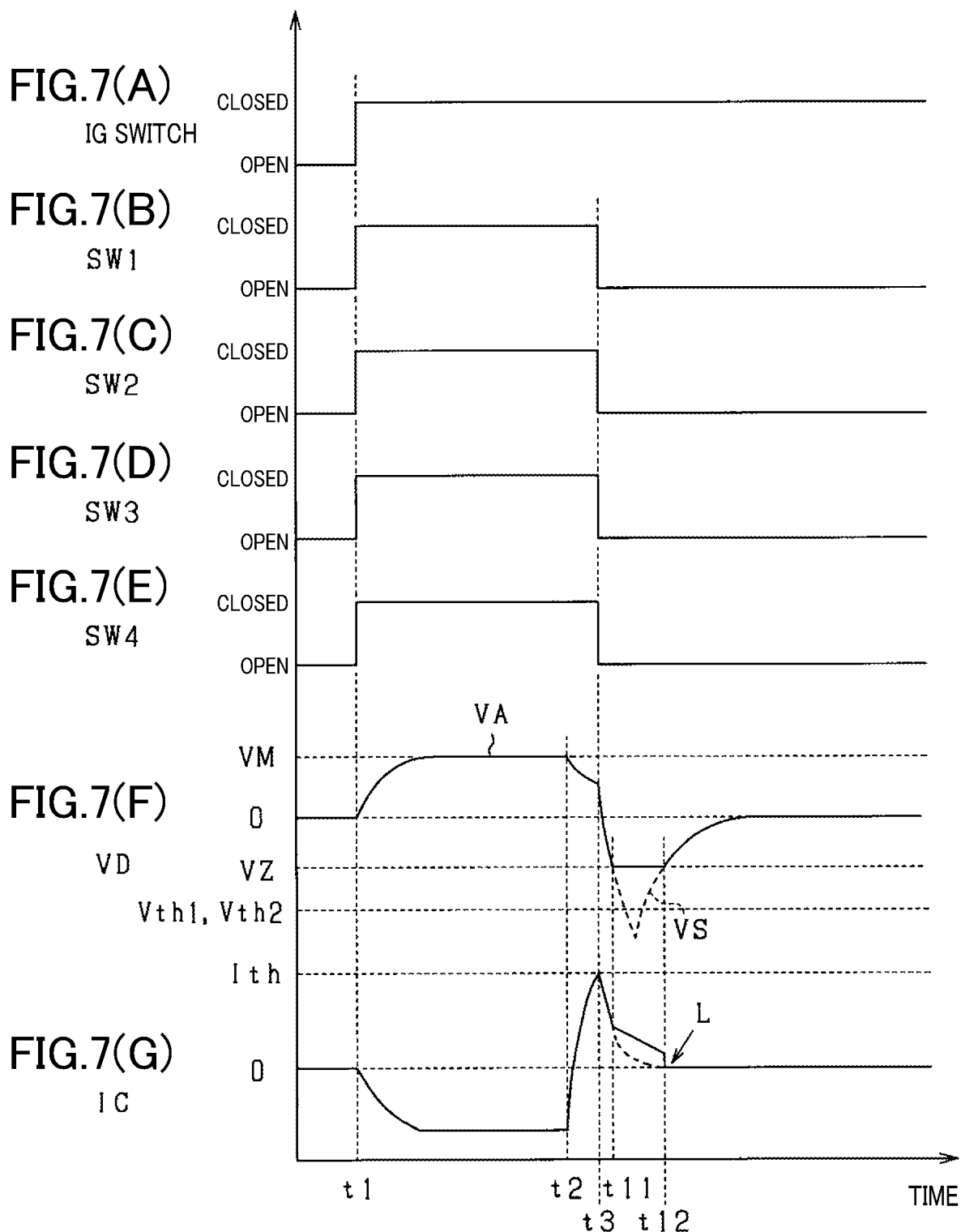
FIGS. 7(A)-7(G) is time chart which demonstrates an example of a control task in the second embodiment.

FIG. 6 shows a flowchart of a control task executed in this embodiment. When the first and second switches SW1 and SW2 are opened in step S21, the routine proceeds to step S26 wherein the relay switch SMR is opened. The second path LC2, as described above, has the bi-directional Zener diode 22 disposed therein, thereby preventing the load voltage VD from dropping below the negative withstand voltages Vth1 and Vth2 of the first to fourth switches SW1 to SW4. The reason for this will be described with reference to FIGS. 7(A) to 7(G).

FIGS. 7(F) and 7(G) demonstrate changes in the load voltage VD and the in-second system current IC in the control task in this embodiment. FIGS. 7(A) to 7(G) correspond to FIGS. 3(A) to 3(G). The operations demonstrated in FIGS. 7(A) to 7(E) are identical with those in FIGS. 3(A) to 3(E) between times t1 and t3. The explanation thereof in detail will be omitted here.

When the first and second switches SW1 and SW2 are opened at time t3 in FIGS. 7(B) and 7(C), the relay switch SMR is opened at time t3 to control the flow of the in-second system current IC. This results in generation of the negative surge voltage VS in the second system ES2. The surge voltage VS occurring at the second system ES2 is higher than the breakdown voltage VZ between times t3 and t11. The in-second system current IC is, therefore, stopped from flowing by the opened relay switch SMR and rectification achieved by the first and second Zeners DT1 and DT2. The stop of flow of the in-second system current IC serves to minimize the over-discharge of the second storage battery 16.

The stop of flow of the in-second system current IC results in a drop in the surge voltage VS, which also results in a drop in the load voltage VD. If the load voltage VD, as indicated by broken lines in FIGS. 7(F) and 7(G), drops below the first negative withstand voltage Vth1 of the first and second switches SW1 and SW2 due to a sharp decrease in the in-second system current IC following the stop of flow thereof, it will result in a failure of the first and second switches SW1 and SW2 in electrically insolating between the first system ES1 which is subjected to no ground fault and the second system ES2 which is experiencing the ground fault. Further, if the load voltage VD exceeds the second negative withstand voltage Vth2 of the third and fourth switches SW3 and SW4 due to a sharp decrease in the in-second system current IC following the stop of flow thereof, it will result in a failure of the third and fourth switches SW3 and SW4 in reducing a risk of over-discharge of the second storage battery 16.

In this embodiment, when the surge voltage VS drops below the breakdown voltage VZ at time t11, it will cause one of the first and second Zeners DT1 and DT2, that is, the first Zener DT1 to lose its rectification function, so that the positive in-second system current IC, as indicated by a solid line in FIG. 7(G), flows through the bi-directional Zener diode 22, in other words, an electrical current is delivered from the second storage battery 16 to the second system ES2. This, as indicated by a solid line in FIG. 7(F), keeps the load voltage VD at the breakdown voltage VZ, thereby reducing a drop in the surge voltage VS to hold the load voltage VD from decreasing below the negative withstand voltages Vth1 and Vth2 of the first to fourth switches SW1 to SW4.

Afterwards, when the surge voltage VS becomes higher than the breakdown voltage VZ at time t12, the in-second system current IC is stopped again from flowing by means of the rectification function of the first and second Zener diodes DT1 and DT2.

The second embodiment offers the following beneficial advantages.

The power supply system in this embodiment includes the first Zener DT1 whose breakdown voltage VZ is higher than the first negative withstand voltage Vth1 of the first and second switches SW1 and SW2 and the second negative withstand voltage Vth2 of the third and fourth switches SW3 and SW4. In operation, when the first and second switches SW1 and SW2 are opened, and the surge voltage VS occurring at the second system ES2 is higher than breakdown voltage VZ, the relay switch SMR is opened to limit the flow of the in-second system current IC. When the surge voltage VS at the second system ES2 becomes lower than breakdown voltage VZ, the first Zener DT1 serves to cancel the limitation of the flow of the in-second system current IC. This minimizes a drop in the negative surge voltage VS generated in the second system ES2 before the surge voltage VS decreases and reaches the negative withstand voltages Vth1 and Vth2 of the first to fourth switches SW1 to SW4, thereby preventing the load voltage VD from being decreased by the surge voltage VS below the negative withstand voltages Vth1 and Vth2 of the first to fourth switches SW1 to SW4.

Specifically, the bi-directional Zener diode 22 is, as described above, connected to the relay switch SMR in parallel thereto. The bi-directional Zener diode 22 includes the first Zener DT1 and the second Zener DT2. The breakdown voltage VZ of the first Zener DT1 whose forward direction is oriented from the junction PB toward the second storage battery 16 is set higher than the negative withstand voltages Vth1 and Vth2 of the first to fourth switches SW1 to SW4. When the first and second switches SW1 and SW2 area opened, and the surge voltage VS occurring at the second system ES2 is higher than the breakdown voltage VZ, the relay switch SMR and the rectification functions of the first and second Zeners DT1 and DT2 serve to stop the flow of the in-second system current IC. When the surge voltage VS occurring at the second system ES2 becomes below the breakdown voltage VZ, it causes the first Zener DT1 to lose its rectification function, so that the positive in-second system current IC flows through the bi-directional Zener diode 22, thereby avoiding a drop in negative surge voltage VS occurring in the second system ES2 to hold the load voltage VD from being decreased by the surge voltage VS below the negative withstand voltages Vth1 and Vth2 of the first to fourth switches SW1 to SW4.

Modification of Second Embodiment

Figure 8:
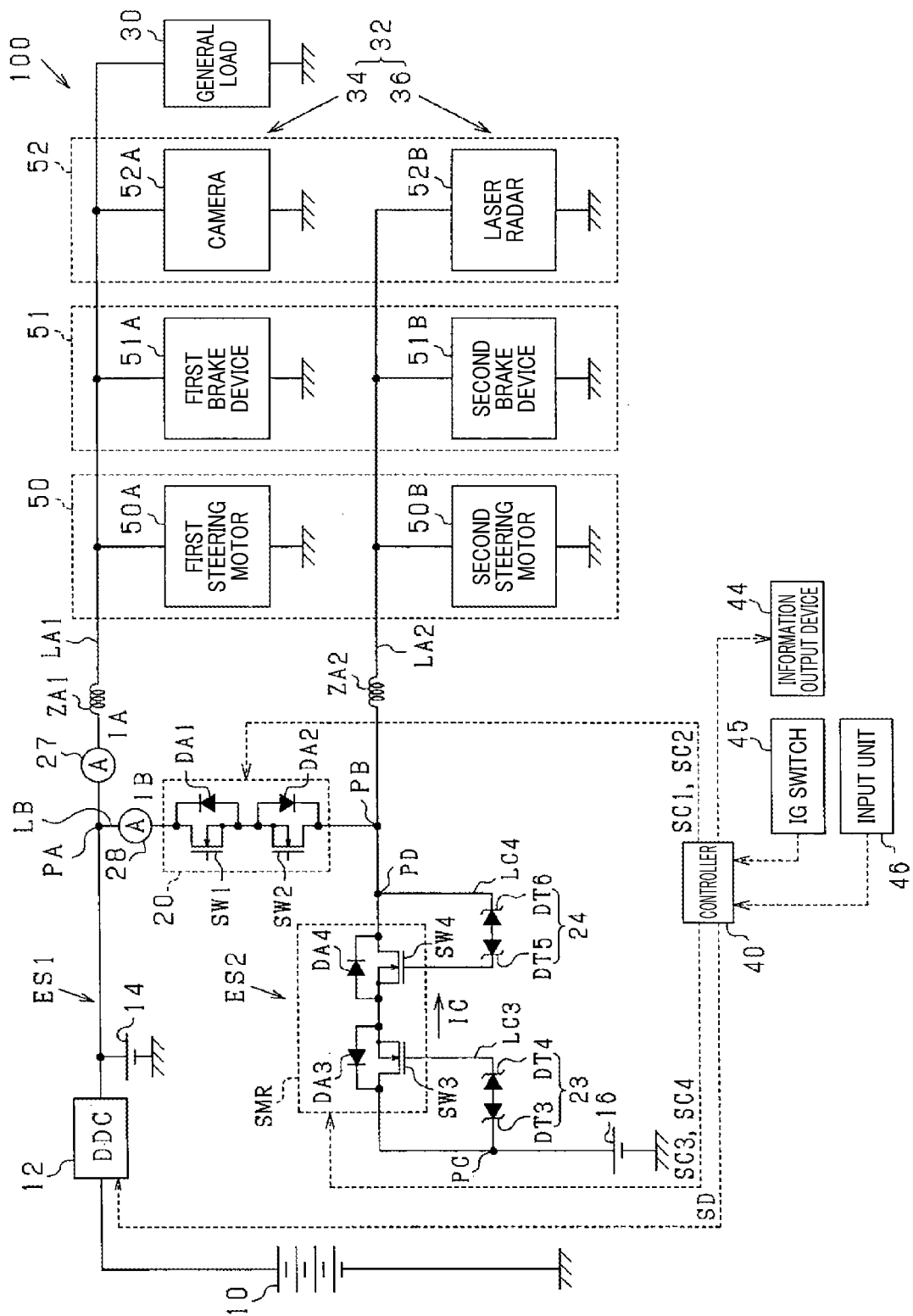
FIG. 8 is a view which illustrates the entire structure of a power supply system in a modification of the second embodiment.

The power supply system may be designed to have bi-directional Zener diodes one for each of the third switch SW3 and the fourth switch SW4 of the relay switch SMR. Specifically, the power supply system, as illustrated in FIG. 8, includes the third path LC3 extending from the junction PC and the gate of the third switch SW3. The junction PC connects between the second storage battery 16 in the second channel path LA2 and the relay switch SMR. The third path LC3 has the first bi-directional Zener diode 23 disposed therein. The first bi-directional Zener diode 23 connects at one end thereof with one of a pair of main terminals, that is, the drain of the third switch SW3 and at the other end with the gate of the third switch SW3. The gate serves as an opening/closing control terminal.

The first bi-directional Zener diode 23 includes the third Zener diode (which will be referred to as third Zener) DT3 and the fourth Zener diode (which will be referred to as fourth Zener) DT4. The third and fourth Zeners DT3 and DT4 are connected in series and oriented in opposite directions. Specifically, the third Zener DT3 is arranged closer to the junction PC than the fourth Zener DT4 is. The third Zener DT3 has an anode located close to the third switch SW3 and a cathode located close to the junction PC. The fourth Zener DT4 has an anode located close to the junction PC and a cathode located close to the third switch SW3.

The power supply system also includes the fourth path LC4 extending between the junction PD and the gate of the fourth switch SW4. The junction PD connects between the relay switch SMR in the second channel path LA2 and the junction PB. The fourth path LC4 has the second bi-directional Zener diode 24 disposed therein. The second Zener diode 24 connects at one end thereof with one of a pair of main terminals, i.e., the drain of the fourth switch SW4 and at the other end with the gate of the fourth switch SW4.

The second bi-directional Zener diode 24 includes the fifth Zener diode (which will be referred to as fifth Zener) DT5 and the sixth Zener diode (which will be referred to as sixth Zener) DT6. The fifth and sixth Zeners DT5 and DT6 are connected in series and oriented in opposite directions. Specifically, the fifth Zener DT5 is arranged closer to the fourth switch SW4 than the sixth Zener DT6 is. The fifth Zener DT5 has an anode located close to the junction PD and a cathode located close to the fourth switch SW4. The sixth Zener DT6 has an anode located close to the fourth switch SW4 and a cathode located close to the junction PD. The third to sixth Zeners DT3 to DT6 have the same breakdown voltage VZ selected to be higher than the negative withstand voltages Vth1 and Vth2 of the first to fourth switches SW1 to SW4.

The control task in this modification is substantially identical with that in the second embodiment. Specifically, when the first and second switches SW1 and SW2 are, as demonstrated in FIGS. 7(B) and 7(C) at time t3, the third and fourth switches SW3 and SW4 are also opened at time t3 to limit the flow of the in-second system current IC. When the surge voltage VS occurring in the second system ES2 is higher than the breakdown voltage VZ, the rectification functions of the third to sixth Zeners DT3 to DT6 serve to reduce voltage applied to the gates of the third and fourth switches SW3 and SW4, so that the third and fourth switches SW3 and SW4 are kept opened.

When the surge voltage VS becomes lower than the breakdown voltage VZ, it causes the rectification function of the third Zener DT3 to be deactivated, so that the voltage applied to the gate of the third switch SW3 arises to close the third switch SW3. The positive in-second system current IC, therefore, flows through the third switch SW3 and the fourth parasitic diode DA4, thereby holding the surge voltage VS from dropping. This prevents the load voltage VD from being decreased by the surge voltage VS below the negative withstand voltages Vth1 and Vth2 of the first to fourth switches SW1 to SW4.

Third Embodiment

The third embodiment will be described below in terms of differences between itself and the first embodiment.

Figure 9:
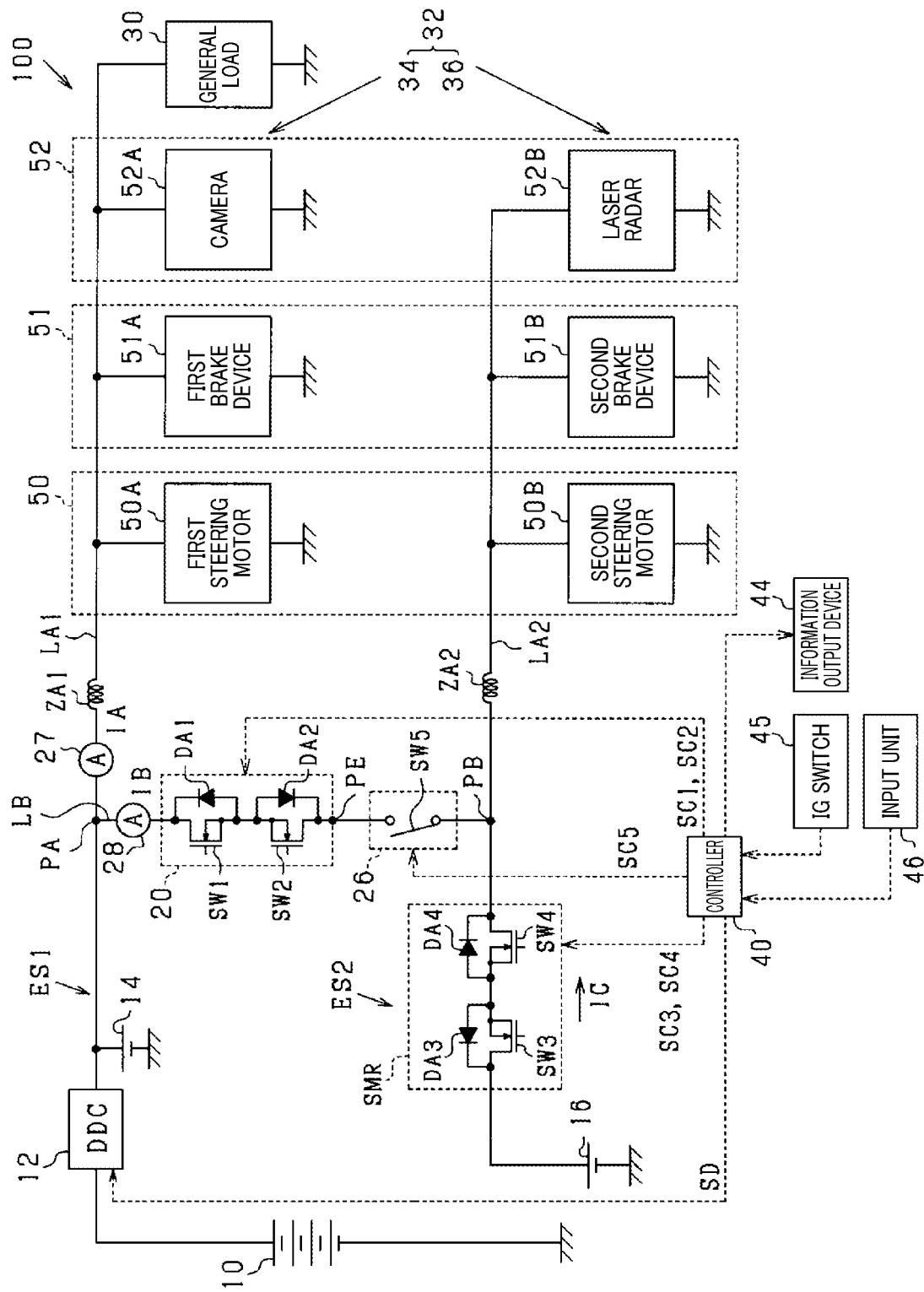
FIG. 9 is a view which illustrates the entire structure of a power supply system according to the third embodiment.

This embodiment is different from the first embodiment in that the power supply system is, as illustrated in FIG. 9, equipped with the switch unit 26 arranged in the connecting path LB closer to the second system ES2 than the switching unit 20 is. In the following discussion, the switching unit 20 will be referred to as the first switching unit 20, and the switch unit 26 will be referred to as the second switch unit 26. The second switch unit 26 includes the fifth switch SW5 which serves as a shut-off switch or a first shut-off switch.

The fifth switch SW5 is implemented by a normally-closed relay. The fifth switch SW5 is, therefore, slower in switching speed than the first and second switches SW1 and SW2, but has a withstand voltage (i.e., dielectric strength) higher than those of the first and second switches SW1 and SW2. In this embodiment, assuming that the negative surge voltage VS occurs in the second system ES2, the fifth switch SW5 is designed to have a negative withstand voltage SW5 smaller in magnitude than the peak VP (see FIG. 11(G)) of the surge voltage VS arising in the second system ES2.

The controller 40 produces and outputs the fifth switching signal SW5 to control an on-off operation of the fifth switch SW5. In the control task, the high-voltage withstanding characteristics of the fifth switch SW5 are used to prevent the load voltage VD from being applied to the first and second switches SW1 and SW2 in order to hold the voltage VX applied to the first and second switches SW1 and SW2 from being decreased by the surge voltage VS below the first negative withstand voltage Vth1 of the first and second switches SW1 and SW2.

Figure 10:
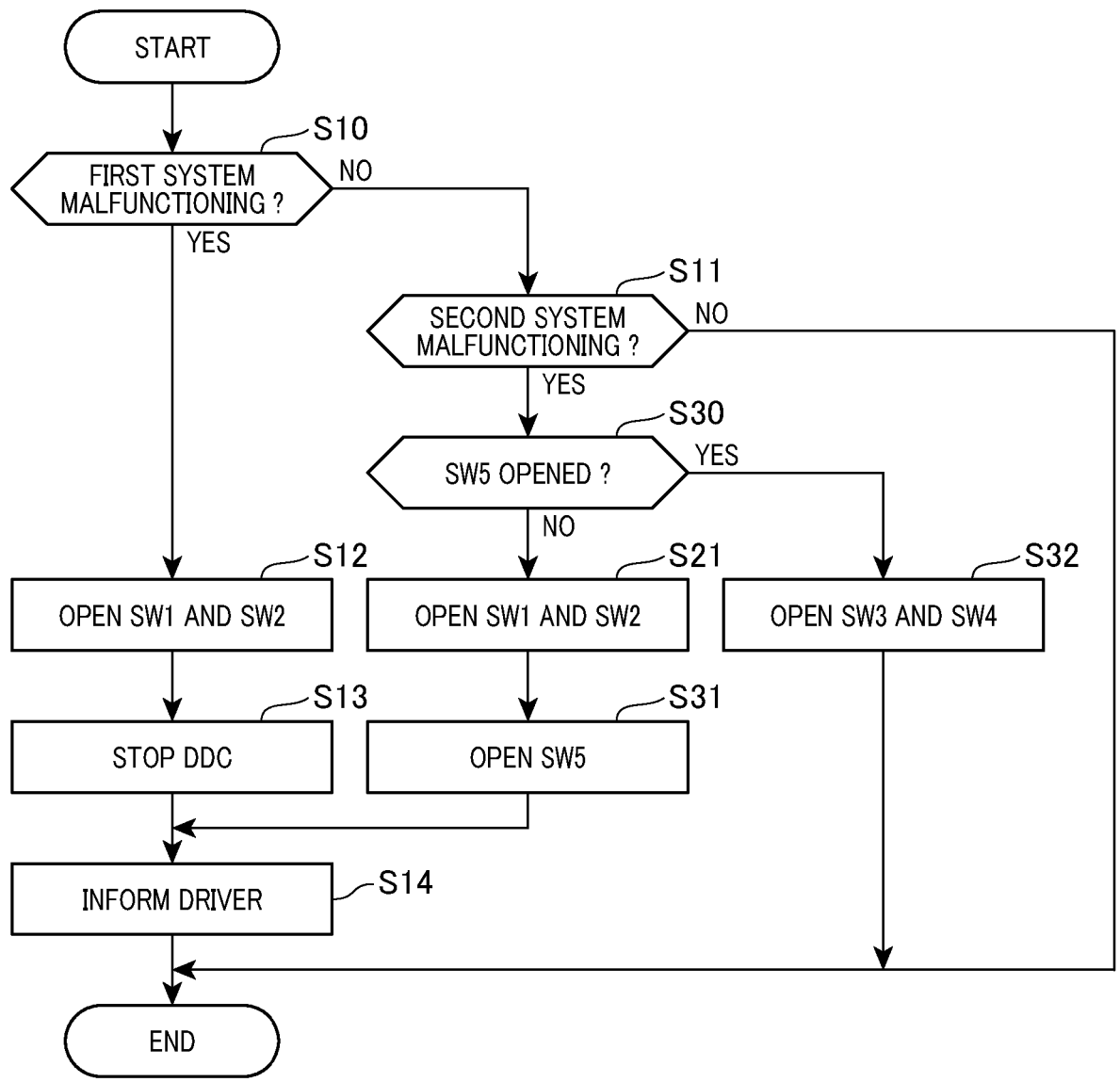
FIG. 10 is a flowchart of a sequence of steps to execute a control task in the third embodiment.

FIG. 10 is a flowchart of a sequence of steps performed in the control task in the third embodiment. The same step numbers as those in FIG. 2 refer to the same operations, and explanation thereof in detail will be omitted here.

After the control task is entered, if a YES answer is obtained in step S11, then the routine proceeds to step S30 wherein it is determined whether the fifth switch SW5 is opened. If a NO answer is obtained, then the routine proceeds to step S21 wherein the first and second switches SW1 and SW2 are opened. The routine then proceeds to step S31.

In step S31, an instruction to open the fifth switch SW5 is outputted. The routine proceeds to step S14. The fifth switch SW5 is, as described above, slower in switching speed than the first and second switches SW1 and SW2 and thus is, unlike the first and second switches SW1 and SW2, opened with a lag following input of the instruction thereto. Specifically, the fifth switch SW5 is, as demonstrated in FIG. 11(F), opened after an elapse of a delay time YD from input of the instruction thereto.

Alternatively, if a YES answer is obtained in step S30 meaning that the delay time YD has expired from the output of the instruction to open the fifth switch SW5, then the routine proceeds to step S32 wherein the third and fourth switches SW3 and SW4 are opened. The routine then terminates.

Figure 11:
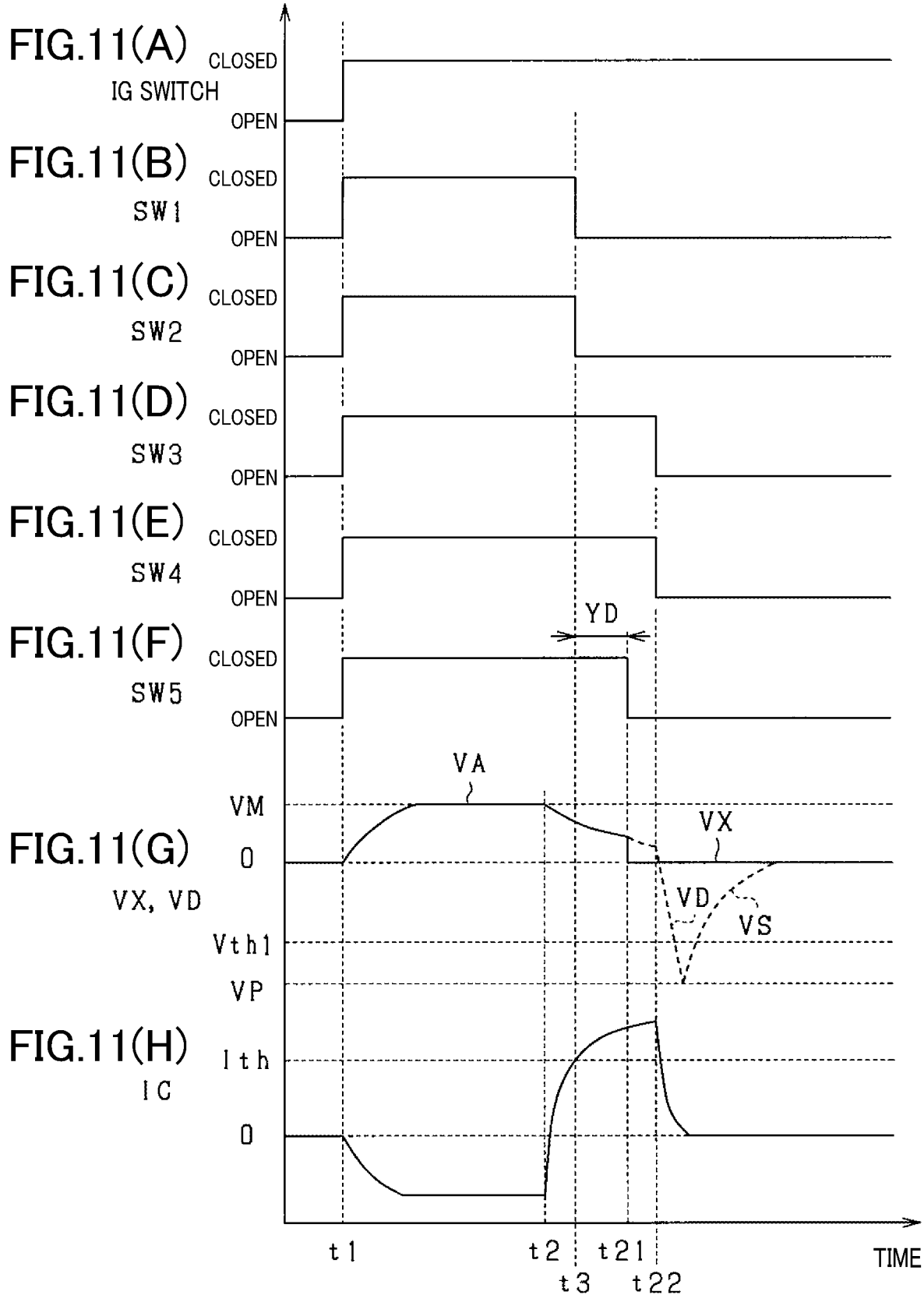
FIGS. 11(A)-11(H) is a time chart which demonstrates an example of a control task in the third embodiment.

FIGS. 11(G) and 11(H) demonstrate changes in the applied voltage VX and the in-second system current IC in the control task executed in this embodiment. The applied voltage VX is voltage applied to the terminal PE of the first switching unit 20 which is located close to the second system ES2.

FIG. 11(F) demonstrates a time-series change in open or closed state of the fifth switch SW5. FIG. 11(G) demonstrates time-series changes in the applied voltage VX and the load voltage VD. FIG. 11(H) demonstrates a time-series change in the in-second system current IC. In FIG. 11(G), the applied voltage VX is indicated by a solid line, and the load voltage VD is indicated by a broken line. FIGS. 11(A) to 11(E) correspond to FIGS. 3(A) and 3(E). The operations between time t1 and time t3 in FIGS. 11(A) to 11(E) are identical with those in FIGS. 3(A) to 3(E) between time t1 and time t3, and explanation thereof in detail will be omitted here.

When the first and second switches SW1 and SW2 are, as illustrated in FIGS. 11(B) and 11(C), at time t3, an instruction to open the fifth switch SW5 is simultaneously outputted at time t3. This causes the fifth switch SW5 to be opened at time t21 the delay time YD behind time t3. The third and fourth switches SW3 and SW4 are still kept closed at time t3. At time t22 following opening of the fifth switch SW5, the third and fourth switches SW3 and SW4 are opened.

Between time t3 and time t21, the first and second switches SW1 and SW2 are placed in the open state, while the third and fourth switches SW3 and SW4 are kept closed. This causes the in-second system current IC to continue to flow, so that no surge voltage VS occurs in the second system ES2. The fifth switch SW5 is also kept closed, so that the applied voltage VX is kept equal to the load voltage VD.

When the fifth switch SW5 is opened at time t21, it will cause the applied voltage VX to be different from the load voltage VD, i.e., become zero. The third and fourth switches SW3 and SW4 are, as described above, kept closed, so that no surge voltage VS occurs in the second system ES2.

Afterwards, when the third and fourth switches SW3 and SW4 are opened at time t22, it stops flow of the in-second system current IC, thereby minimizing a risk of over-discharge of the second storage battery 16. The stop of flow of the in-second system current IC generates the negative surge voltage VS, which usually results in a drop in the load voltage VD. In this embodiment, the fifth switch SW5 is opened before the load voltage VD drops. The fifth switch SW5, as described above, has the high-voltage withstanding characteristics, thereby preventing the load voltage VD from being applied to the first and second switches SW1 and SW2 even when the load voltage VD has dropped below the first negative withstand voltage Vth1 of the first and second switches SW1 and SW2. This holds the applied voltage VX from decreasing below the first negative withstand voltage Vth1 of the first and second switches SW1 and SW2.

The third embodiment has the following beneficial advantages.

In order to electrically insulate between the first system ES1 and the second system ES2 upon occurrence of a malfunction of, for example, the second system ES2, the first and second switches SW1 and SW2 are, as described above, opened. Quick insulation between the first system ES1 which is subjected to no malfunction and the second system ES2 which is malfunctioning requires high-speed switching operations of the first and second switches SW1 and SW2. As long as the first and second switches SW1 and SW2 have high-voltage withstanding characteristics in addition to the high-speed switching ability, they are capable of withstanding the surge voltage VS occurring in the second system ES2. The use of the first and second switches SW1 and SW2 designed to have the high-speed switching ability and the high-voltage withstanding characteristics, however, results in an increase in total production cost of the power supply system 100.

In order to alleviate the above drawback, the third embodiment has the fifth switch SW5 arranged in the connecting path LB closer to the second system ES2 than the first and second switches SW1 and SW2 are. The fifth switch SW5 is opened simultaneously with opening of the first and second switches SW1 and SW2, after which the third and fourth switches SW3 and SW4 are opened. This operation requires the first and second switches SW1 and SW2 only to have the high-speed switching ability without need to have the high-voltage withstanding characteristics, thus resulting in a decrease in production cost of the power supply system 100. Upon opening of the first and second switches SW1 and SW2, the fifth switch SW5 is, as described above, simultaneously opened prior to opening of the third and fourth switches SW3 and SW4, thereby avoiding an undesirable drop in voltage VX applied to the first and second switches SW1 and SW2 by means of the fifth switch SW5 having the high-withstanding voltage characteristics even when the surge voltage VS arises in the second system ES2 due to the opening of the third and fourth switches SW3 and SW4. This eliminates a risk of an excessive drop in the voltage VX applied to the first and second switches SW1 and SW2 in addition to limitation of flow of the in-second system current IC.

Modification of Third Embodiment

Figure 12:
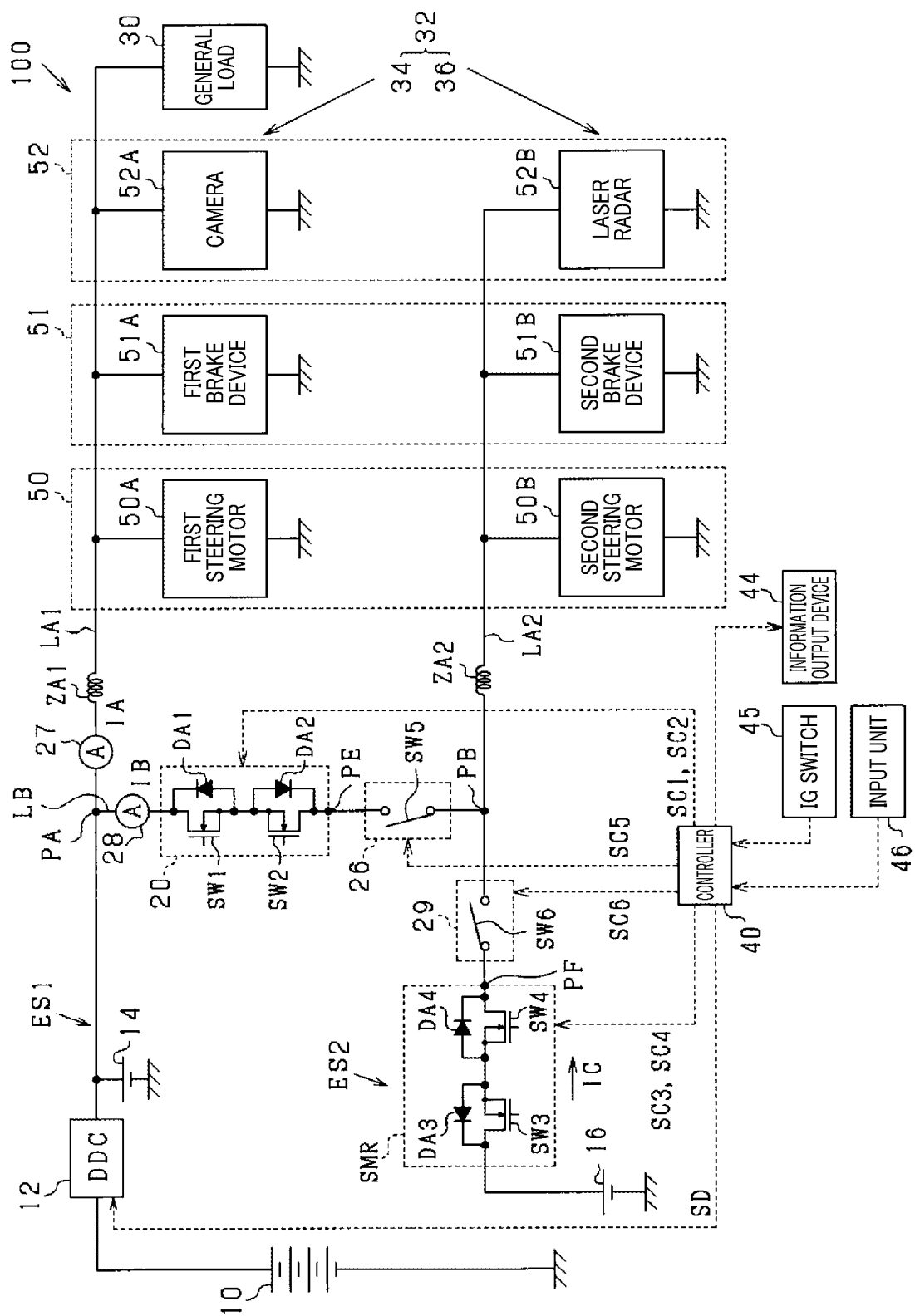
FIG. 12 is a view which illustrates the entire structure of a power supply system in a modification of the third embodiment.

The power supply system may be designed to have high-voltage withstanding characteristics, one in each of the connecting path LB and the second channel path LA2. Specifically, the power supply system may also include, as illustrated in FIG. 12, the third switch unit 29 disposed in the second channel path LA2 between the junction PB and the relay switch SMR. The third switch unit 29 includes the sixth switch SW6 which serves as a second shut-off switch.

The sixth switch SW6 is implemented by a normally-closed relay. The sixth switch SW6 is, therefore, slower in switching speed than the third and fourth switches SW3 and SW4, but has a withstand voltage higher than those of the third and fourth switches SW3 and SW4. In this modification, assuming that the negative surge voltage VS occurs in the second system ES2, the sixth switch SW6 is designed to have a negative withstand voltage smaller in magnitude than the peak VP (see FIG. 14(H)) of the surge voltage VS arising in the second system ES2.

The controller 40 produces and outputs the sixth switching signal SW6 to control an on-off operation of the sixth switch SW6. In the control task, the high-voltage withstanding characteristics of the sixth switch SW6 are used to prevent the load voltage VD from being applied to the third and fourth switches SW3 and SW4 in order to hold the voltage VY applied to the third and fourth switches SW3 and SW4 from being decreased by the surge voltage VS below the second negative withstand voltage Vth2 of the third and fourth switches SW3 and SW4.

Figure 13:
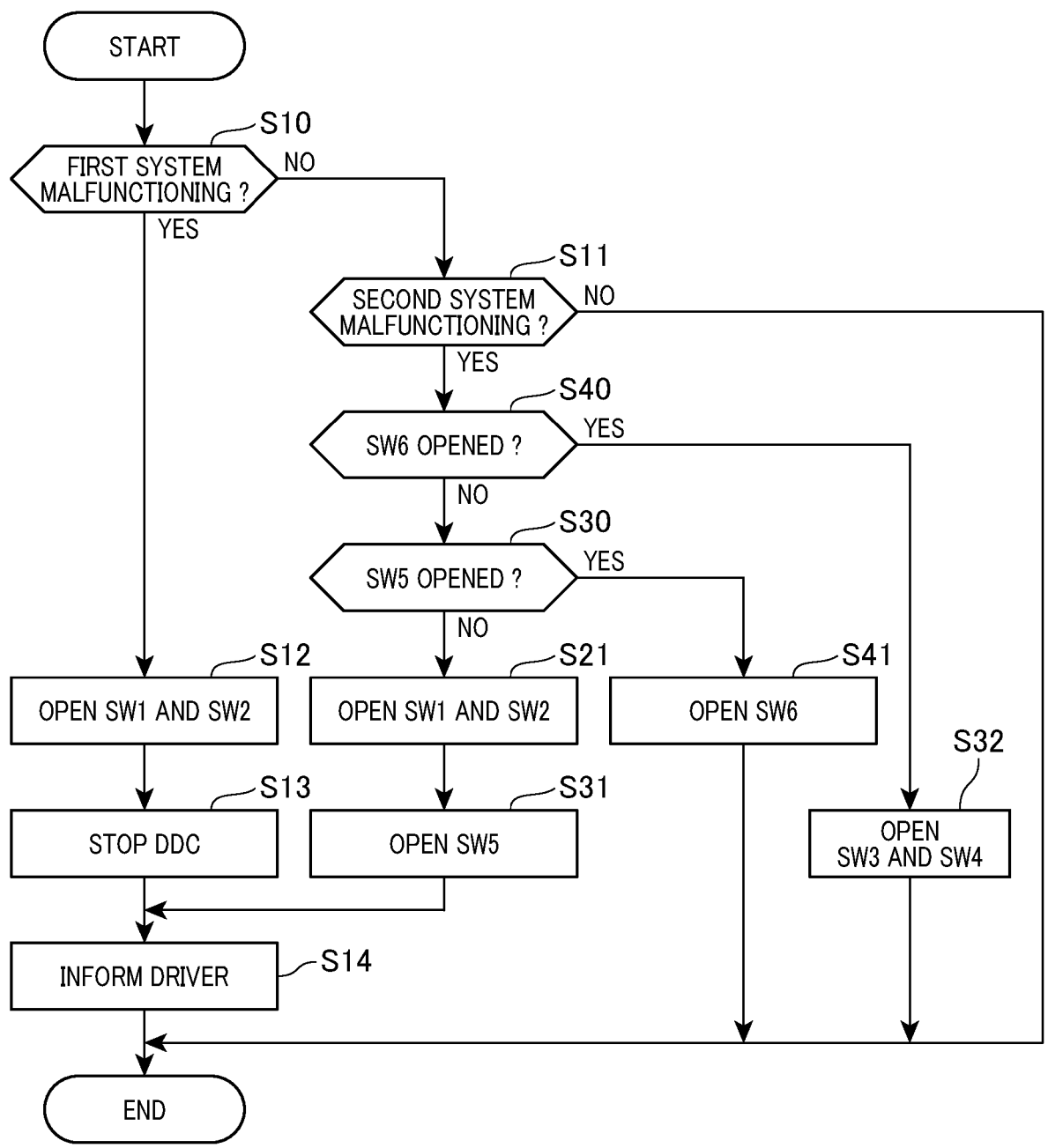
FIG. 13 is a flowchart of a sequence of steps to execute a control task in a modification of the third embodiment.

FIG. 13 is a flowchart of a sequence of steps performed in the control task in this modification. The same step numbers as those in FIG. 10 refer to the same operations, and explanation thereof in detail will be omitted here.

After the control task is entered, if a YES answer is obtained in step S11, then the routine proceeds to step S40 wherein it is determined whether the sixth switch SW6 is opened. If a NO answer is obtained, then the routine proceeds to step S30 wherein it is determined whether the fifth switch SW5 is opened. If a NO answer is obtained, then the routine proceeds to step S21 wherein the first and second switches SW1 and SW2 are opened. The routine then proceeds to step S31 wherein an instruction to open the fifth switch SW5 is outputted.

Alternatively, if a YES answer is obtained in step S30 meaning that the delay time YD has expired from the output of the instruction to open the fifth switch SW5, then the routine proceeds to step S41 wherein an instruction to open the sixth switch SW6 is outputted. The routine then terminates. The sixth switch SW6 is, as described above, slower in switching speed than the third and fourth switches SW3 and SW4 and thus is, unlike the third and fourth switches SW3 and SW4, opened with a lag following input of the instruction thereto. Specifically, the sixth switch SW6 is opened after an elapse of the delay time YD from input of the instruction thereto. In the following discussion, the delay time YD of the fifth switch SW5 will be referred to as the first delay time YD1, and the delay time YD of the sixth switch SW6 will be referred to as the second delay time YD2 (see FIGS. 14(F) and 14(G)).

If a YES answer is obtained in step S40 meaning that the second delay time YD2 has expires from output of the instruction to open the sixth switch SW6 is outputted, then the routine proceeds to step S32 wherein the third and fourth switches SW3 and SW4 are opened. The routine then terminates.

FIGS. 14(H) and 14(I) demonstrate time-series changes in the applied voltage VY and the in-second system current IC in the control task of this modification. The applied voltage YV is voltage applied to the terminal PF of the relay switch SMR which is located close to the second loads 36.

FIG. 14(G) demonstrates sequential opening or closing operations of the sixth switch SW6. FIG. 14(F) demonstrates time-series changes in the applied voltage VY and the load voltage VD. FIG. 14(I) demonstrates a time-series change in the in-second system current IC. FIG. 14(H) represents the applied voltage VY using a solid line and the load voltage VD using a broken line. FIGS. 14(A) to 14(F) correspond to FIGS. 11(A) to 11(F). The operations shown in FIGS. 14(A) to 14(F) between time t1 and time t3 are identical with those in FIGS. 11(A) to 11(F) between time t1 and time t3, and explanation thereof in detail will be omitted here.

When the first and second switches SW1 and SW2 are, as demonstrated in FIGS. 14(B) and 14(C), opened at time t3, an instruction to open the fifth switch SW5 are simultaneously outputted. This causes the fifth switch SW5 to be opened at time t31 after an elapse of the first delay time YD1 since time t3.

An instruction to open the sixth switch SW6 is also outputted at time t32 after the fifth switch SW5 is opened. This causes the sixth switch SW6 to be opened at time t33 after an elapse of the second delay time YD2 since time t32. At time t3, the third and fourth switches SW3 and SW4 are still kept closed. At time t34 after the sixth switch SW6 is opened, the third and fourth switches SW3 and SW4 are opened.

Between time t3 and t33, the first and second switches SW1 and SW2 are kept opened, while the third and fourth switches SW3 and SW4 are kept closed. This causes the in-second system current IC to continue to flow, so that no surge voltage VS occurs in the second system ES2. The sixth switch SW6 is kept closed, so that the applied voltage VY is kept equal to the load voltage VD.

The fifth switch SW5 is opened at time t31. The sixth switch SW6 is opened at time t33. The opening of the sixth switch SW6 causes the applied voltage VY to be different from the load voltage VD, that is, to be zero, and also blocks the flow of the in-second system current IC. Such blocking of flow of the in-second system current IC avoids the over-discharge of the second storage battery 16, but however, results in generation of the negative surge voltage VS, which decreases the load voltage VD.

Prior to a drop in load voltage VD, the fifth and sixth switches SW5 and SW6 are opened. The fifth and sixth switches SW5 and SW5 have the high-voltage withstanding characteristics, thereby avoiding the application of the load voltage VD to the first and second switches SW1 and SW2 even when the load voltage VD has decreased below the first negative withstand voltage Vth1 of the first and second switches SW1 and SW2. This holds the applied voltage VX from dropping below the first negative withstand voltage Vth1 of the first and second switches SW1 and SW2 and also avoids the application of the load voltage VD to the third and fourth switches SW3 and SW4 even when the load voltage VD has dropped below the second negative withstand voltage Vth2 of the third and fourth switches SW3 and SW4, thus holding the applied voltage VY from drooping below the second negative withstand voltage Vth2 of the third and fourth switches SW3 and SW4.

This modification is, as described above, equipped with the fifth switch SW5 which is disposed in the connecting path LB closer to the second system ES2 than the first and second switches SW1 and SW2 are. The fifth switch SW5 is higher in withstand voltage than the first and second switches SW1 and SW2. This modification is also equipped with the sixth switch SW6 which is disposed between the junction PB and the third and fourth switches SW3 and SW4 in the second channel path LA2. The sixth switch SW6 is higher in withstand voltage than the third and fourth switches SW3 and SW4. In operation, when the first and second switches SW1 and SW2 are opened, the sixth switch SW6 is opened after the fifth switch SW5 is opened, but before the third and fourth switches SW3 and SW4 are opened.

When the opening of the sixth switch SW6 results in generation of the surge voltage VS in the second system ES2, the fifth switch SW5 which has high-voltage withstanding characteristics serves to eliminate an undesirable drop in the voltage VX applied to the first and second switches SW1 and SW2. Additionally, the sixth switch SW6 which has high-voltage withstanding characteristics also serves to eliminate an undesirable drop in the voltage VY applied to the third and fourth switches SW3 and SW4. This ensures the stability in applying the voltages VX and VY to the first to fourth switches SW1 to SW4 without sacrificing the limitation of flow of the in-second system current IC.

Fourth Embodiment

The fourth embodiment will be described below in terms of differences between itself and the first embodiment with reference to FIGS. 16 to 16(H).

Figure 15:
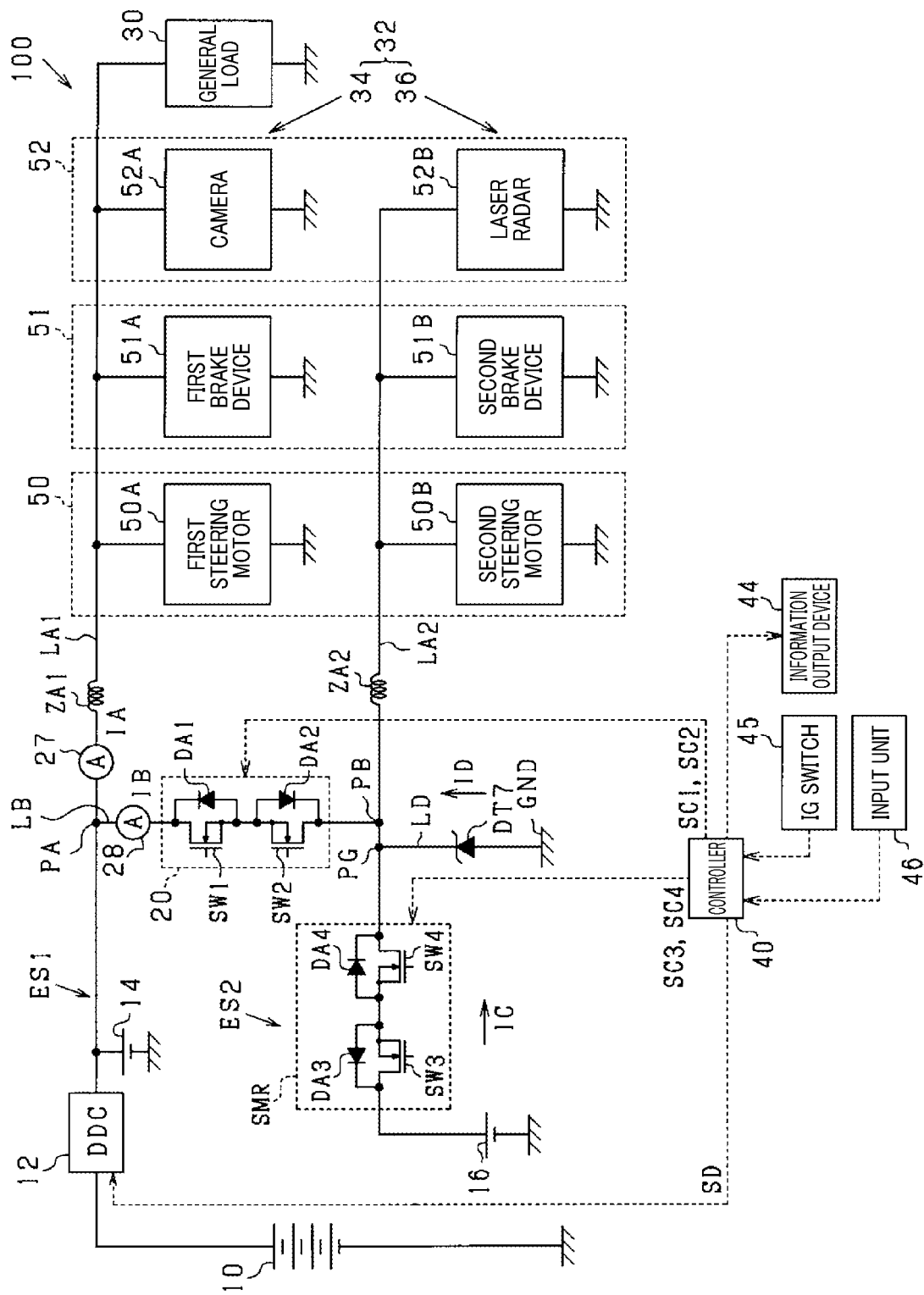
FIG. 15 is a view which illustrates the entire structure of a power supply system according to the fourth embodiment.

This embodiment is different from the first embodiment in that the power supply system 100 in this embodiment is, as illustrated in FIG. 15, equipped with the ground path LD disposed between the junction PG in the and the grounding member GND. The junction PG connects between the junction PB and the relay switch SMR in the second channel path LA2. The grounding member GND serves to develop a ground voltage as a reference voltage. The ground path LD has the seventh Zener diode (also called seventh Zener) DT7 disposed therein. In the following discussion, the junction PB will be referred to as the first junction PB, and the junction PG will be referred to as the second junction PG. The ground voltage is higher in electric potential than the negative withstand voltages Vth1 and Vth2 of the first to fourth switches SW1 to SW4. The grounding member GND also serves as a reference voltage member.

The seventh Zener DT7 is oriented to have a forward direction from the grounding member GND to the second junction PG, that is, have an another located close to the grounding member GND and a cathode located close to the second junction PG. The breakdown voltage VZ of the seventh Zener DT7 is selected to be lower than the positive withstand voltage Vth3 that is a dielectric strength of the first to fourth switches SW1 to SW4 against a positive voltage.

A control task executed in this embodiment is substantially identical with that in the second embodiment. Specifically, after the first and second switches SW1 and SW2 are, as illustrated in FIG. 6, opened at step S21, the routine proceeds to step S26 wherein the relay switch SMR is opened. In this embodiment, the ground path LD has the seventh Zener DT7 disposed therein, thereby preventing the load voltage VD from arising above the positive withstand voltage Vth3 of the first to fourth switches SW1 to SW4 or dropping below the negative withstand voltages Vth1 and Vth2 of the first to fourth switches SW1 to SW4. The reason for this will be described below with reference to FIGS. 16(A) to 16(H).

FIGS. 16(F) and 16(H) demonstrate time-series changes in the load voltage VD and the grounding current ID in the control task executed in this embodiment. The ground current ID, as referred to herein, is an electrical current flowing from the grounding member GND to the second junction PG through the ground path LD.

FIG. 16(H) represents a time-series change in the ground current ID. FIGS. 11(A) to 11(G) are identical with FIGS. 3(A) to 3(G). FIGS. 16(F) and 16(H) indicate values of the load voltage VD and the grounding current ID using solid lines when the positive surge voltage VS occurs in the second system ES2 or using broken lines when the negative surge voltage VS occurs in the second system ES2. The operations in FIGS. 11(A) to 11(G) between time t1 and time t3 are identical with those in FIGS. 3(A) to 3(G) between time t1 and time t3, and explanation thereof in detail will be omitted here.

When the first and second switches SW1 and SW2 are, as demonstrated in FIGS. 16(B) and 16(C) at time t3, the relay switch SMR is simultaneously opened at time t3 to limit the flow of the in-second system current IC, thereby resulting in generation of the surge voltage VS in the second system ES2.

When the negative surge voltage VS occurs in the second system ES2, it, as indicated by the broken line in FIG. 16(F), results in a drop in the load voltage VD. When the load voltage VD drops below the ground voltage at time t41, it causes the rectification function of the seventh Zener DT7 to create the positive ground current ID, as indicated by the broken line in FIG. 16(H), which flows from the grounding member GND to the second system ES2. This causes the load voltage VD, as indicated by the broken line in FIG. 16(F), to be kept at the ground voltage to eliminate a drop in the surge voltage VS, thereby holding the load voltage VD form decreasing below the negative withstand voltages Vth1 and Vth2 of the first to fourth switches SW1 to SW4.

When the positive surge voltage VS occurs in the second system ES2, it, as indicated by the solid line in FIG. 16(F), results in a rise in the load voltage VD. When the load voltage VD becomes higher than the breakdown voltage VZ at time t42, it causes the seventh Zener DT7 to lose the rectification function thereof, so that the negative ground current ID, as indicated by the solid line in FIG. 16(H), flows through the seventh Zener DT7. This causes the load voltage VD, as indicated by the solid line in FIG. 16(F), to be kept at the breakdown voltage VZ to eliminate a rise in the surge voltage VS, thereby holding the load voltage VD from elevating above the positive withstand voltage Vth3 of the first to fourth switches SW1 to SW4.

Afterwards, when the surge voltage VS has dropped below the breakdown voltage VW at time t43, the rectification function of the seventh Zener DT7 serves to stop the flow of the ground current ID again.

The power supply system 100 in this embodiment, as described above has the seventh Zener DT7 which is arranged between the second junction PG and the grounding member GND and has the forward direction from the grounding member GND toward the second junction PG. The seventh Zener DT7 is designed to have the breakdown voltage VZ lower than the positive withstand voltage Vth3 of the first to fourth switches SW1 to SW4. With these arrangements, when the positive surge voltage VS occurs in the second system ES2, it causes the seventh Zener DT7 to lose the rectification function thereof, thereby keeping the voltages VX and XY applied to the first to fourth switches SW1 to SW4 at the breakdown voltage VZ of the seventh Zener DT7, which holds the applied voltages VX and XY from arising above the positive withstand voltage Vth3 of the first to fourth switches SW1 to SW4.

The ground voltage at the grounding member GND is selected to be higher than the negative withstand voltages Vth1 and Vth2 of the first to fourth switches SW1 to SW4. This causes the seventh Zener DT7 to create the rectification function when the negative surge voltage VS arises in the second system ES2, thereby keeping the voltages VX and XY applied to the first to fourth switches SW1 to SW4 at the ground voltage. This holds the voltages VX and XY from arising above the negative withstand voltages Vth1 and Vth2 of the first to fourth switches SW1 to SW4.

Other Embodiments

This disclosure is not limited to the above embodiments and may be modified in the following ways.

The first and second loads 34 and 36 may be implemented by devices as discussed below.

The loads 34 and 36 may be a drive motor working to output torque to move a vehicle or a drive circuit for the drive motor. Specifically, the loads 34 and 36 may be made of a three-phase permanent magnet synchronous motor and a three-phase inverter.

The loads 34 and 36 may be antilock brake devices. Specifically, the loads 34 and 36 may be implemented by ABS actuators which work to independently control hydraulic pressures to brake the vehicle.

The loads 34 and 36 may be implemented by cruise control devices which detect a vehicle traveling ahead of a vehicle equipped with the power supply system 100 and maintain a distance from the vehicle in front. When no vehicle in front is detected, the cruise control devices work to move the vehicle equipped with the power supply system 100 at a set speed. For instance, the loads 34 and 36 may be millimeter-wave radars.

The loads 34 and 36 do not need to be implemented by a combination of the same type of devices, but may be devices different in function from each other. Alternatively, the loads 34 and 36 may be designed to a single unit supplied with electrical power both from the first channel path LA1 and from the second channel path LA2.

The first power supply may be made of an alternator instead of the converter. The first power supply may alternatively be designed to have no converter, but include only the first storage battery 14.

The above embodiments, as described above, works to open the system-to-system switches and simultaneously open or close the in-system switches in response to occurrence of a malfunction of the second system ES2, but however, the power supply system may alternatively be designed to control the opening or closing of the in-system switches after an elapse of a given period of time following opening of the system-to-system switch.

The first embodiment exemplifies the generation of a negative surge voltage in the second system ES2, but however, a positive surge voltage may arise in the second system ES2. In such a case, the power supply system may be equipped with a diode which is joined to the second in-system switch in parallel thereto and oriented to have a forward direction from the joint with the second in-system switch toward the second power supply. In operation, when it is required to open the system-to-system switches, the power supply system may work to open the second in-system switch and close the first in-system switch.

The modification of the first embodiment, as described above, works to decrease the duty cycle of the switching signal outputted to the third switch SW3 with an increase in time elapsed from time t3 in the control task, but however, may be designed to fix the value of the duty cycle to one or less regardless of the time elapsed from time t3.

The second embodiment is, as described above, equipped with the bi-directional Zener diode 22 used as a bi-directional diode, but however, may alternatively be designed to have the bi-directional Zener diode 22 equipped with the second Zener DT2 made of an electrical device other than a Zener diode.

The second embodiment, as described above, exemplifies the generation of a negative surge voltage in the second system ES2, but however, may be designed for the case where a positive surge voltage occurs in the second system ES2. In such a case, the power supply system is preferably designed to have a Zener diode which has a breakdown voltage lower than positive withstand voltages of the system-to-system switches and the in-system switch. In operation, the power supply system opens the in-system switch when it is required to open the system-to-system switches, and the surge voltage in the second system ES2 is lower than the breakdown voltage, thereby limiting the flow of electrical current from the second power supply to the second system ES2. When the surge voltage in the second system ES2 becomes higher than the breakdown voltage, the power supply system works to cancel the limitation of the flow of the current, so that the current flows between the second power supply and the second system ES2 using the Zener diode.

Specifically, the bi-directional diode is made up of two diodes which are connected in series with each other and oriented to have opposite forward directions. The bi-directional diode is connected to the in-system switch in parallel thereto. Of the diodes constituting the bi-directional diode which, one which has the forward direction from the second power supply to the junction between the bi-directional diode and the in-system switch may be preferably made of a Zener diode.

The modification of the second embodiment is, as described above, equipped with the bi-directional Zener diodes 23 and 24, one for each of the third switch SW3 and the fourth switch SW4, but however, may alternatively be designed not to have the first bi-directional Zener diode 23 for the third switch SW3.

The third embodiment exemplifies the generation of a negative surge voltage in the second system ES2, but however, a positive surge voltage may arise in the second system ES2. The power supply system of the third embodiment is capable of limiting the flow of electrical current from the second power supply to the second system ES2 in the presence of a positive surge voltage in the second system ES2 and also preventing voltage applied to the system-to-system switches from undesirably dropping.

The third embodiment may be designed to have the shut-off switch implemented by a semiconductor switch, such as a MOSFET, instead of the relay SMR as long as it is higher in dielectric strength than the system-to-system switches.

The above embodiments exemplify the power supply system 100 designed for vehicles capable of moving selectively in the manual and autonomous drive modes, but however, may be used with autonomous vehicles movable only in the autonomous drive mode or vehicles movable only in the manual drive mode.

In the case where the power supply system 100 is used with an automotive vehicle capable of moving only in the autonomous drive mode, and a malfunction occurs in one of the systems ES1 and ES2, the power supply system 100 may work to use the load 34 or 36 of the other of the systems ES1 and ES2 which is operating properly to stop the vehicle or move the vehicle to a safe area and then stop it in the autonomous drive mode.

This disclosure has been referred to in terms of the embodiments, but it is not limited thereto. This disclosure includes a variety of modifications of the embodiments or equivalents thereto. Therefore, the disclosure should be understood to include all possible embodiments and modifications to the shown embodiments which can be embodied without departing from the principle of the disclosure as set forth in the appended claims.

What is claimed is:

1. A power supply system comprising:
   a first system which serves to deliver electrical power from a first power supply to an electrical load through a first power feeding path;
   a second system which serves to deliver electrical power from a second power supply to the electrical load through a second power feeding path;
   a system-to-system switch which is disposed in a connecting path which connects the first power feeding path and the second power feeding path together;
   an in-system switch which is disposed between a junction and the second power supply, the junction connecting between the second power feeding path and the connecting path;
   a malfunction determiner which determines whether a malfunction has occurred in the second system when the system-to-system switch and the in-system switch are placed in a closed state;
   a condition controller which works to open the system-to-system switch when the malfunction is determined by the malfunction determiner to have occurred; and
   a voltage drop controller which works to control an opening-closing operation of the in-system switch when the condition controller opens the system-to-system switch, thereby limiting flow of an electrical current from the second power supply to the second system, the voltage drop controller also working to avoid an excessive drop in voltage, as applied to the system-to-system switch, which arises from a surge voltage generated in the second system due to limitation of the flow of the electrical current.

2. The power supply system as set forth in claim 1, wherein when the condition controller opens the system-to-system switch, the voltage drop controller controls the opening-closing operation of the in-system switch to reduce a rate of decrease in electrical current flowing from the second power supply to the second system.

3. The power supply system as set forth in claim 2, wherein the in-system switch includes a first in-system switch and a second in-system switch which are connected in series with each other, the in-system switch being equipped with a diode which is connected to the first in-system switch in parallel thereto and has a forward direction from the second power supply to the junction connecting between the second power feeding path and the connecting path,
when the condition controller opens the system-to-system switch, the voltage drop controller opens the first in-system switch and closes the second in-system switch.

4. The power supply system as set forth in claim 2, wherein when the condition controller opens the system-to-system switch, the voltage drop controller works to gradually decrease a duty cycle of an operating signal outputted to the in-system switch.

5. The power supply system as set forth in claim 1, wherein the voltage drop controller is equipped with a Zener diode which has a breakdown voltage higher than a negative withstand voltage of the system-to-system switch and the in-system switch,
when a surge voltage generated in the second system is higher than the breakdown voltage at a time when the condition controller opens the system-to-system switch, the voltage drop controller works to open the in-system switch to limit the flow of the electrical current from the second power supply to the second system, when the surge voltage generated in the second system becomes lower than the breakdown voltage, the Zener diode working to cancel the limitation of the flow of the electrical current between the second power supply and the second system.

6. The power supply system as set forth in claim 5, wherein a bi-directional diode is connected to the in-system switch in parallel thereto, the bi-directional diode including a first diode and a second diode which are connected in series with each other and oriented to have opposite forward directions,
the first diode has the forward direction from the junction to the second power supply and is made of said Zener diode.

7. The power supply system as set forth in claim 5, wherein said Zener diode includes a plurality of Zener diodes,
a bi-directional Zener diode is connected at an end thereof to one of a pair of main terminals of the in-system switch, the bi-directional Zener diode includes series-connected two of said Zener diodes which are oriented to have opposite forward directions,
the bi-directional Zener diode is connected at a first end thereof to one of a pair of main terminals of the in-system switch,
the bi-directional Zener diode is connected at a second end thereof to an opening/closing control terminal of the in-system switch.

8. The power supply system as set forth in claim 1, further comprising a shut-off switch which is arranged in the connecting path closer to the second system than the system-to-system switch is and has a withstand voltage higher than that of the system-to-system switch, and wherein
when the condition controller opens the system-to-system switch, the voltage drop controller first opens the shut-off switch and subsequently opens the in-system switch.

9. The power supply system as set forth in claim 8, further comprising a first shut-off switch implemented by said shut-off switch and a second shut-off switch which is disposed between the junction connecting between the second power feeding path and the connecting path and the in-system switch and has a withstand voltage higher than that of the in-system switch, and wherein
when the condition controller opens the system-to-system switch, the voltage drop controller works to open the second shut-off switch after the first shut-off switch is opened and before the in-system switch is opened.

10. The power supply system as set forth in claim 1, wherein the junction connecting between the second power feeding path and the connecting path is a first junction,
the voltage drop controller is equipped with a Zener diode which is arranged between a second junction and a reference voltage member in connection therewith, the second junction being located between the first junction and the in-system switch in the second power feeding path, the reference voltage member developing a given reference voltage, the Zener diode of the voltage drop controller being oriented to have a forward direction from the reference voltage member toward the second junction and has a breakdown voltage lower than positive withstand voltages of the system-to-system switch and the in-system switch,
the given reference voltage is higher than negative withstand voltages of the system-to-system switch and the in-system switch,
when the condition controller opens the system-to-system switch, the voltage drop controller opens the in-system switch.

* * * * *